United States Patent
Thiel et al.

(10) Patent No.: US 11,784,374 B1
(45) Date of Patent: *Oct. 10, 2023

(54) RADIO BATTERY LID

(71) Applicant: LAT Enterprises, Inc., Raleigh, NC (US)

(72) Inventors: Laura Thiel, Raleigh, NC (US); Giancarlo Urzi, Raleigh, NC (US)

(73) Assignee: LAT ENTERPRISES, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,289

(22) Filed: Nov. 17, 2022

Related U.S. Application Data

(63) Continuation of application No. 17/573,262, filed on Jan. 11, 2022, now Pat. No. 11,509,017.

(51) Int. Cl.
| | |
|---|---|
| *H01M 50/247* | (2021.01) |
| *H01M 50/271* | (2021.01) |
| *H01M 50/231* | (2021.01) |
| *H01M 50/224* | (2021.01) |
| *H01M 50/24* | (2021.01) |
| *H02J 7/00* | (2006.01) |

(52) U.S. Cl.
CPC ....... *H01M 50/247* (2021.01); *H01M 50/224* (2021.01); *H01M 50/231* (2021.01); *H01M 50/24* (2021.01); *H01M 50/271* (2021.01); *H01M 2220/30* (2013.01); *H02J 7/0048* (2020.01)

(58) Field of Classification Search
CPC .......................... H01M 50/247; H01M 50/271
See application file for complete search history.

(56) References Cited

U.S. PATENT DOCUMENTS

| | | | |
|---|---|---|---|
| 6,546,873 | B1 | 4/2003 | Andrejkovics et al. |
| 7,141,330 | B2 | 11/2006 | Aoyama |
| 8,059,412 | B2 | 11/2011 | Perkins, III et al. |
| 8,149,592 | B2 | 4/2012 | Perkins, III et al. |
| 8,462,491 | B2 | 6/2013 | Perkins, III et al. |
| 8,531,846 | B2 | 9/2013 | Perkins, III et al. |
| 8,885,354 | B2 | 11/2014 | Perkins, III et al. |
| 9,153,978 | B2 | 10/2015 | Reade et al. |
| 11,025,076 | B2 | 6/2021 | Thiel et al. |
| 2006/0260971 | A1 | 11/2006 | Rivera et al. |
| 2013/0164567 | A1 | 6/2013 | Olsson et al. |
| 2016/0112004 | A1 | 4/2016 | Thiel et al. |
| 2017/0229692 | A1 | 8/2017 | Thiel et al. |
| 2017/0259956 | A1 | 9/2017 | Hori et al. |
| 2018/0062197 | A1 | 3/2018 | Thiel et al. |
| 2018/0102656 | A1 | 4/2018 | Thiel et al. |
| 2021/0329803 | A1 | 10/2021 | D'Angella et al. |

OTHER PUBLICATIONS

L3Harris Falcon 111 AN/PRC-117G (V) 1 (C) Manpack Radio Product literature [AN/PRC] (L3Harris Technologies Oct. 2019) {https://www.l3harris.com/alL-capabilities/an-prc-117gv1c-multiband-networking-manpack-radio}.

*Primary Examiner* — Jonathan G Jelsma
(74) *Attorney, Agent, or Firm* — NEO IP

(57) ABSTRACT

A battery housing unit including a lid, a base, and a plurality of electrochemical battery cells. The lid includes at least two channels for receiving at least one post from a military radio. The base includes a locking latch configured to attach to a corresponding catch of a military radio.

20 Claims, 15 Drawing Sheets

SECTION A-A

SECTION D-D

SECTION A-A

DETAIL B
SCALE 2 : 1

SECTION C-C

190

US 11,784,374 B1

RADIO BATTERY LID

CROSS REFERENCES TO RELATED APPLICATIONS

This application is related to and claims priority from the following U.S. patents and patent applications. This application is a continuation of U.S. application Ser. No. 17/573,262, filed Jan. 11, 2022, which is incorporated herein by reference in its entirety.

BACKGROUND OF THE INVENTION

1. Field of the Invention

The present invention relates to battery housings, and more specifically to battery housing lids.

2. Description of the Prior Art

It is generally known in the prior art to provide battery lids for military radio batteries.

U.S. Pat. No. 8,059,412 for integrated power supply and platform for military radio by inventors Perkins et al., filed Jan. 26, 2009 and issued Nov. 15, 2011, is directed to an improved power supply and platform for a military radio. The apparatus includes a base that is adapted and arranged for supporting a HARRIS 117 radio and a power amplifier adapted to amplify radio frequency output of the radio. The connectors include an electrical connector for the radio and a connector for the amplifier. A power supply is housed within the assembly. A power supply for the connector to the amplifier is also housed within the assembly. Also included is a wiring harness for a SINCGARS LS/671 device and a LED indicator to identify which radio is in operation for multiple radio configurations.

U.S. Pat. No. 8,149,592 for sealed power supply and platform for military radio by inventors Perkins et al., filed Jun. 15, 2010 and issued Apr. 3, 2012, is directed to an AC/DC power supply and platform for a military radio. The apparatus includes a base that supports at least one SINCGARS RT-1523 radio. The base is connected to an AC power supply and at least one DC power supply. The AC supply and DC power supply are configured to switch automatically to the DC power supply should the AC power supply fail. The housing of the platform is sealed from the exterior environment with gaskets.

U.S. Pat. No. 8,462,491 for platform for military radio with vehicle adapter amplifier by inventors Perkins et al., filed Mar. 31, 2011, and issued Jun. 11, 2013, is directed to a platform for a military radio with a vehicle adapter amplifier. The apparatus includes a base for supporting at least one SINCGARS RT-1523 radio. The platform has a first power supply that includes a DC power converter for converting 110/220 alternating current into +28 Volt direct current and a second power supply that converts +28 Volt direct current into +6.75 Volts direct current, +13 Volts direct current and +200 Volt direct current. The platform includes a vehicle adapter power amplifier that provides range extension to said SINCGARS RT-1523 radio.

U.S. Pat. No. 8,531,846 for integrated AC/DC power supply and platform for military radio by inventors Perkins et al., filed Jun. 7, 2010 and issued Sep. 10, 2013, is directed to an AC/DC power supply and platform for a military radio. The apparatus includes a base that supports at least one SINCGARS RT-1523 radio. The base is connected to an AC power supply and at least one DC power supply. The AC supply and DC power supply are configured to switch automatically to the DC power supply should the AC power supply fail.

U.S. Pat. No. 8,885,354 for mount platform for multiple military radios by inventors Perkins et al., filed Mar. 15, 2013 and issued Nov. 11, 2014, is directed to a platform for a military radio with a vehicle adapter amplifier. The apparatus includes a base for supporting dual AN/VRC-110 radio systems. The platform has a first power supply that includes a DC power converter for converting 110/220 alternating current into +28 Volt direct current and a second power supply that converts +28 Volt direct current into +6.75 Volts direct current, +13 Volts direct current and +200 Volt direct current. The platform includes a vehicle adapter power amplifier that provides range extension to said dual AN/VRC-110 radio systems.

U.S. Pat. No. 7,141,330 for secondary battery accommodation case by inventor Aoyoma, filed Mar. 4, 2003 and issued Nov. 28, 2006 is directed to a secondary battery accommodation case with improved exterior surface having no parting line in two or more exterior faces out of four exterior faces encircling the battery accommodation portion. It comprises a substantially rectangular bottom case having a battery accommodation portion for accommodating secondary batteries and a top case to be assembled with the bottom case for closing the battery accommodation portion. In the assembled condition of the top case and the bottom case, the exterior face of the top case closing the secondary battery accommodation portion is made equal to or lower than two or more open edges of four exterior faces encircling the battery accommodation portion in the bottom case.

U. S. Patent Pub. No. 20160112004 for material for dissipating heat from and/or reducing heat signature of electronic devices and clothing by inventors Thiel et al., filed Oct. 16, 2014 and published Apr. 21, 2016, is directed to a material for dissipating heat from and/or reducing the heat signature of electronic devices and clothing. In one example, a heat-dissipating and/or heat signature-reducing layer is sandwiched between two substrates, wherein the substrates may be flexible, rigid, or a combination of both flexible and rigid. Further, examples of the heat-dissipating and/or heat signature-reducing layer include anti-static, anti-radio frequency (RF), anti-electromagnetic interference (EMI), anti-tarnish, and/or anti-corrosion materials.

U. S. Patent Pub. No. 20210329803 for adaptive transceiver power supply by inventors D'Angella et al., filed Jun. 14, 2020 and published Oct. 21, 2021, is directed to a power supply including an AC-DC power conversion module; a DC-DC power module and an onboard battery backup. The power supply is an adaptable power supply which configures to provide AC-DC power; DC only power and battery backup power. The AC and DC power modules are independent and separable, and may be configured by the radio user to remove the AC module and operate in a DC only mode. The adaptability of the power supply includes universal power supply for the Harris Corporation Falcon III series of radios which includes the AN/PRC-117G; RF-7800H-MP; RF-7800M-MP; RF-7800-RC; AN/PRC-160 and the RF-7800-RT intelligence, surveillance and reconnaissance terminal.

U. S. Patent Pub. No. 20170229692 for material for dissipating heat from and/or reducing heat signature of electronic devices and clothing by inventors Thiel et al., filed Mar. 27, 2017 and published Aug. 10, 2017, is directed to systems, methods and articles having a heat-shielding or blocking, heat-dissipating and/or heat signature-reducing material layer or coating. In one example, the heat-shielding or blocking, heat-dissipating and/or heat signature-reducing material completely covers the interior of a housing having a plurality of battery cells removably disposed therein. Other examples include a heat-shielding or blocking, heat-dissipating and/or heat signature-reducing material layer having anti-static, anti-radio frequency (RF), anti-electromagnetic interference (EMI), anti-tarnish, and/or anti-corrosion materials and properties that effectively protect battery-operated devices and/or the batteries that power them from damage or diminished operation.

U. S. Patent Pub. No. 20180062197 for portable power case by inventors Thiel et al., filed Jul. 31, 2017 and published Mar. 1, 2018, is directed to systems, methods, and articles for a portable power case. The portable power case is comprised of at least one battery and at least one PCB. The portable power case has at least two access ports and at least one USB port. The portable power case is operable to supply power to an amplifier, a radio, a wearable battery, a mobile phone, and a tablet. The portable power case is operable to be charged using solar panels, vehicle batteries, AC adapters, non-rechargeable batteries, and generators. The portable power case provides for modularity that allows the user to disassemble and selectively remove the batteries installed within the portable power case housing.

U.S. Pat. No. 11,025,076 for portable power case with lithium iron phosphate battery by inventors Thiel et al., filed Nov. 14, 2018 and issued Jun. 1, 2021, is directed to systems, methods, and articles for a portable power case. The portable power case is comprised of at least one battery and at least one PCB. The portable power case has at least one USB port and at least two access ports, at least two leads, or at least one access port and at least one lead. The portable power case is operable to supply power to an amplifier, a radio, a wearable battery, a mobile phone, and a tablet. The portable power case is operable to be charged using solar panels, vehicle batteries, AC adapters, non-rechargeable batteries, and generators. The portable power case provides for modularity that allows the user to disassemble and selectively remove the batteries installed within the portable power case housing.

U.S. Pat. No. 9,153,978 for charging apparatus and portable power supply by inventors Reade, et al., filed Jul. 27, 2011 and issued Oct. 6, 2015, is directed to a portable battery box is suitable for charging and housing a battery and comprises: a charging apparatus for charging a battery; a hollow lid shell and a hollow base shell for housing a rechargeable battery, the base hollow shell including a base wall, a top wall and at least one side wall extending between the base and top walls; and at least one handle disposed in a respective one of the side walls of the hollow base shell. Also described is a method for monitoring the charging of a battery in use disposed within a battery box, the method including the steps of: measuring first charging and/or discharging parameters at selected time intervals; estimating selected other charging parameters at selected time intervals; and displaying the first and other charging or discharging parameters on a display screen associated with the battery box, the charging or discharging parameters being selected from the group consisting of: battery voltage; charging cycle; time to charge completion; time to discharge completion; condition of the battery; battery charging current; battery discharging current.

U.S. Pat. No. 6,546,873 for apparatus for remote activation of equipment and demolition charges by inventors Andrejkovics et al., filed Apr. 3, 2000 and issued Apr. 15, 2003, is directed to an apparatus for the activation of a remote device having a transmitter to generate and transmit user-set special coded signals. The transmitter has a function selector switch to select modes of operation for the transmitter. Included is also a receiver to receive the user-set special coded signals, and the receiver also has a function selector switch to select modes of operation for the receiver. The function selector switch selects the following modes of operation for the transmitter: (a) a "transmit/fire" mode that enables a fire signal to be transmitted to the receiver; (b) a "wake-up" mode that enables a set-up receiver mode for immediate firing; (c) a program mode for low power transmission of programmed codes; and (d) a "test" and operational mode that enables an operational test of the apparatus with no firing output. The function selector switch on the receiver selects the following modes of operation for the receiver: (a) receive a "wake-up" of "fire" signal; (b) actuate either an electrical excitation output or an electromechanical solenoid output; (c) provide a continuity test for a blasting cap; (d) program the receiver for receiving programmed codes; and (e) conduct operational tests of the receiver.

U. S. Patent Pub. No. 20130164567 for modular battery apparatus, systems, and methods by inventors Olsson et al., filed Jun. 25, 2012 and published Jun. 27, 2013, is directed to modular sealed battery packs configured to provide enhanced performance and safety features, along with associated apparatus, systems, and methods for monitoring and controlling operation and use of such battery packs and associated coupled devices and systems.

SUMMARY OF THE INVENTION

The present invention relates generally to a battery housing including a lid configured to receive a plurality of radios.

It is an object of this invention to receive a plurality of radios that have different post positions.

In one embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels are longer than the least one post, and a recessed lid portion, wherein the base further includes a first mounting plaque, a second mounting plaque, a first locking latch secured to the first mounting plaque, and a second locking latch secured to the second mounting plaque, wherein the first locking latch and the second locking latch are operable to attach the battery housing unit to a corresponding catch of the military radio.

In another embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels have a length greater than about 15 mm, and a recessed lid portion, wherein the base further includes a first mounting plaque, a second mounting plaque, a first locking latch secured to the first mounting plaque, a second locking latch secured to the second mounting plaque, and a base recessed portion including at least one recessed hole and at least one connector, wherein the first locking latch and the second locking latch are operable to attach the battery housing unit to a corresponding catch of the military radio, and wherein the at least one connector is secured in the at least one recessed hole.

In yet another embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels have a length greater than about 30 mm, and a recessed lid portion, wherein the base further includes a first mounting plaque, a second mounting plaque, a first locking latch secured to the first mounting plaque, a second locking latch secured to the second mounting plaque, and a coating to protect the plurality of electrochemical battery cells from electromagnetic interference, wherein the first locking latch and the second locking latch are operable to attach the battery housing unit to a corresponding catch of the military radio.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART

PRIOR ART

DETAILED DESCRIPTION

Figure 1:
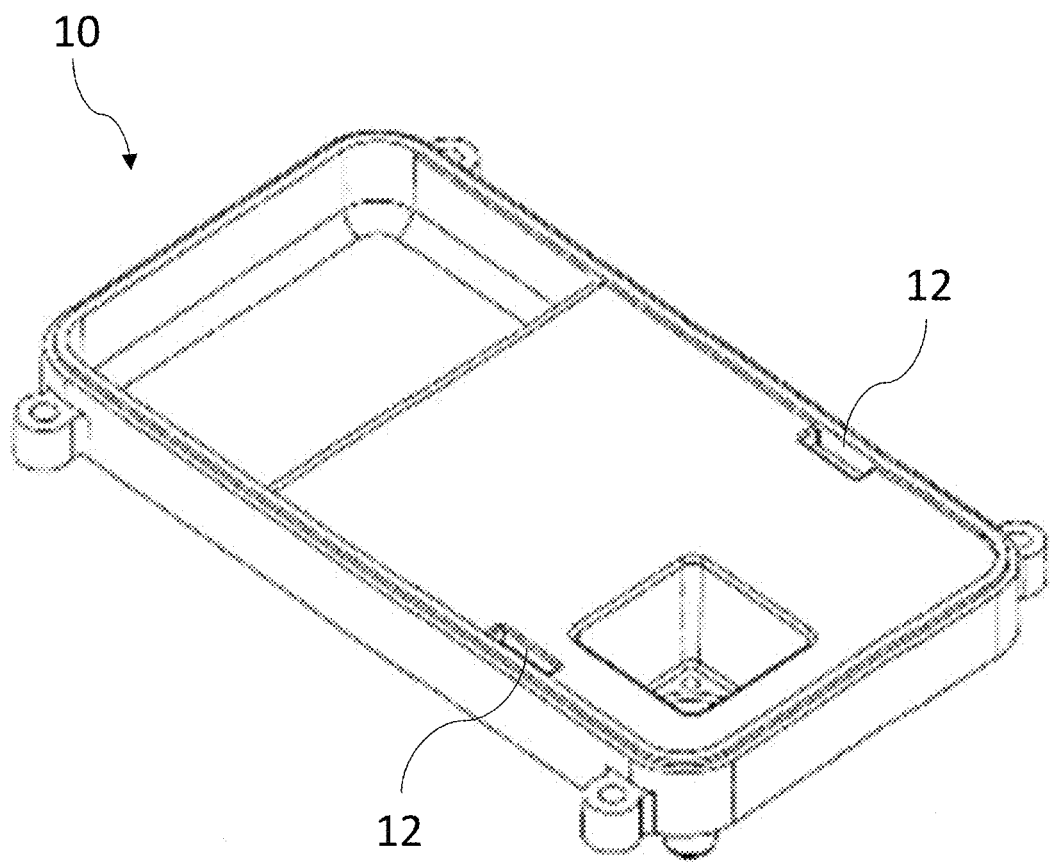
FIG. 1 illustrates an example of a prior art battery lid.

The present invention is generally directed to a battery housing configured to receive and attach to a radio.

In one embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels are longer than the least one post, and a recessed lid portion, wherein the base further includes a first mounting plaque, a second mounting plaque, a first locking latch secured to the first mounting plaque, and a second locking latch secured to the second mounting plaque, wherein the first locking latch and the second locking latch are operable to attach the battery housing unit to a corresponding catch of the military radio. In one embodiment, the at least two channels include a first channel and a second channel, and wherein the first channel and the second channel are positioned on opposite sides of the elevated portion. In one embodiment, the at least two channels have a length that is equivalent to a length of the elevated portion. In one embodiment, the military radio is an AN/PRC-117G radio, an AN/PRC-160 radio, an AN/PRC-167 radio, a RF-7800H-MP radio, a RF-7800M-MP radio, a RF-7800-RC radio, or a RF-7800-RT intelligence radio. In one embodiment, the at least two channels have a length between about 70 mm to about 100 mm. In one embodiment, the at least two channels have a length greater than about 15 mm. In one embodiment, the lid further includes a military specification radio connector operable to mate to a corresponding military specification radio connector on the military radio. In one embodiment, the base further includes a recessed base portion including at least one recessed hole and at least one connector. In one embodiment, the battery housing unit includes a coating to protect the plurality of electrochemical battery cells from electromagnetic interference. In one embodiment, the base is formed of a plastic material and/or a carbon fiber. In one embodiment, the lid is formed of a plastic material and/or a carbon fiber. In one embodiment, the battery housing unit has a weight of less than about 1.5 kg. In one embodiment, the plurality of electrochemical battery cells is contained in at least one casing. In one embodiment, the lid and/or the base includes a unitary and integrally formed piece of plastic formed via injection molding. In one embodiment, the recessed portion has a depth of at least 10 mm.

In another embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels have a length greater than about 15 mm, and a recessed lid portion, wherein the base further includes a first mounting plaque, a second mounting plaque, a first locking latch secured to the first mounting plaque, a second locking latch secured to the second mounting plaque, and a base recessed portion including at least one recessed hole and at least one connector, wherein the first locking latch and the second locking latch are operable to attach the battery housing unit to a corresponding catch of the military radio, and wherein the at least one connector is secured in the at least one recessed hole. In one embodiment, the battery housing unit further includes at least one dust cap to cover the at least one connector. In one embodiment, the at least one connector includes a keyway, wherein the keyway ensures a correct orientation of a cable attached to the at least one connector, and wherein the keyway angles the cable away from the first locking latch or the second locking latch.

In yet another embodiment, the present invention provides a battery housing unit including a lid, a base, and a plurality of electrochemical battery cells provided within the base, wherein the lid further includes an elevated portion including at least two channels, wherein the at least two channels are configured to receive at least one post of a military radio, wherein the at least two channels have a length greater than about 30 mm, and a recessed lid portion, wherein the base further includes a first mounting plaque, a second mounting plaque, a first locking latch secured to the first mounting plaque, a second locking latch secured to the second mounting plaque, and a coating to protect the plurality of electrochemical battery cells from electromagnetic interference, wherein the first locking latch and the second locking latch are operable to attach the battery housing unit to a corresponding catch of the military radio. In one embodiment, the coating includes copper.

Team operations in remote locations, such as military operations, require radios to allow team members to communicate about danger, injuries, opportunities, etc. Without radios in these environments, more people would be injured or die. These operations also require other equipment (e.g., amplifiers, wearable batteries, mobile phones, tablets) to allow team members to communicate, survey the environment, etc. The radios and other equipment typically require lithium ion batteries. However, the lithium ion batteries may not be able to the power the radios and other equipment for the time necessary to complete the operation on a single charge.

Furthermore, many radios have at least one post or another similar attachment method that corresponds to a slot on the lid of a battery housing unit. This slot is not movable, so the lid is limited to being used with specific radios. Radio manufacturers move the post around, which creates problems for military operators. A military operator cannot carry a variety of lids for each different type of radio because this would increase the weight of their rucksack, which can be the difference between life and death during military operations. Further, lids are often attached (e.g., via screws) to the base of the battery housing unit, so changing a lid would require a tool (e.g., a screwdriver), and using the tool during a mission is not practical. Therefore, there is a need for a lid of a battery housing unit that is configured to receive a plurality of radios with different post positions to enable military operators to only need one lid for their missions.

Yet another problem for military operators is having to swap batteries during military operations and/or firefights to use communication devices (e.g., radio). The military operator is forced to swap batteries while on the run, so the operator must find cover and/or be able to quickly swap out the battery. The military operator is not able to use the radio from the time the battery dies to the time the battery is replaced. Additionally, to replace the battery, the operator must take the battery out of their rucksack and/or pouch, undo a locking mechanism, replace the battery, swap the battery lid if a different style of battery and/or radio is used, redo the latch, and place the battery back in the rucksack or pouch. Every extra second during a firefight could be the difference between life and death.

Further, some radios are operable to function with a battery box, which weighs about 0.227 kg (0.5 pounds). The battery box includes latches to attach to the radio and is operable to hold a battery. Thus, the battery is placed into the battery box (i.e., a second housing), which has a total of weight of about 1.13-1.59 kg (2.5-3.5 pounds) when the battery is installed in the battery box. The battery box does not include a lid, which allows for components protruding from the base of the radio to extend into the battery box. When the battery within the battery box needs to be replaced, an operator needs to remove the battery from the battery box, which requires disconnecting the radio. Additionally, this requires opening the latches, which creates noise that could give away an operator's location. Users of a battery box will typically carry an additional 0.91-4.54 kg (2-10 pounds) in weight of replacement batteries on their person, depending on the load and duration of the mission. Generally, the batteries within the battery box are operable to power a radio for approximately 9-10 hours. This second housing increases the weight and complexity of the system (e.g., packing for a mission requires both replacement batteries and the second housing).

Another method used to attach radios to a power source includes using a battery eliminator. The battery eliminator is operable to power a radio. However, the battery eliminator is typically formed using a metal housing. Additionally, the battery eliminator is heavy (e.g., 2.27-4.54 kg (5-10 pounds)) relative to the combined weight of the battery and battery box (e.g., 1.13-1.59 kg (2.5-3.5 pounds)). Battery eliminators historically do not provide a run time that is more than 15-30 minutes. This is only intended to give an operator enough time to find an alternate AC power source, not run a mission. Battery eliminators are also usually intended to remain static and attached or tethered to an external power supply (e.g., vehicle, generator, wall outlet, inverter). Battery eliminators are not intended to be carried on dismounted operations.

None of the prior art discloses a battery housing with a lid including two channels that are configured to receive posts from a plurality of radios (e.g., military radios). Advantageously, the lid including the two channels allows for the battery to be used with a plurality of radios. This facilitates the ability to only have to carry one power source for multiple radios. Additionally, this allows military personnel to fly to a location with a single battery that is able to power multiple radios (i.e., mates to a plurality of radios) while still adhering to commercial air regulations that only allow traveling with two large form factor lithium ion batteries. Furthermore, when a military unit purchases a battery for a radio, they no longer are forced to purchase another battery when a new radio is released. There is a long felt, unmet need for a battery housing with a lid including two channels that are configured to receive posts from a plurality of radios (e.g., military radios).

Referring now to the drawings in general, the illustrations are for the purpose of describing one or more preferred embodiments of the invention and are not intended to limit the invention thereto.

PRIOR ART FIG. 1 is an example of a prior art battery lid. The prior art battery lid 10 includes a plurality of slots 12 configured to receive a post corresponding to a radio.

However, the posts on the radio are not movable, so the lid is limited to being used with radios that have posts in the same positions as the holes on the lid. If radios with different post positions are attached to the prior art battery lid, then the radio will not attach or it will loosely attach to the lid, thereby failing to seal against the radio gasket and allowing environmental egress into the battery (e.g., dirt, water, etc.). Each of the plurality of slots 12 has a length of about 12.7 mm (0.5 inches), a width of about 3.175 mm (0.125 inches), and a depth of about 3.175 mm (0.125 inches). Each of the plurality of slots 12 is positioned about 34.9 mm (1.375 inches) from an edge of a width of the lid.

Figure 2:
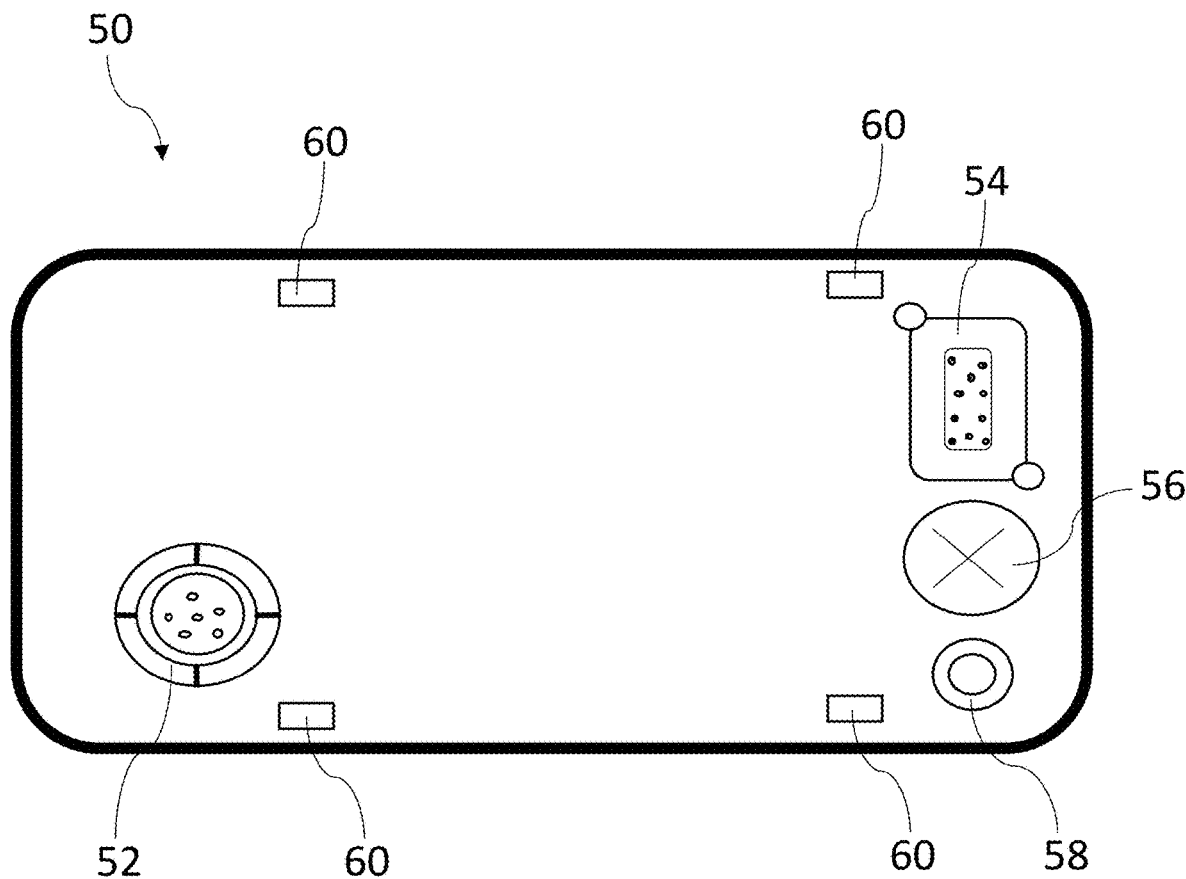
FIG. 2 illustrates a bottom perspective of a PRC-117G radio.

PRIOR ART FIG. 2 illustrates a bottom perspective of a PRC-117G radio 50. The PRC-117G radio 50 includes a J10 battery connector 52 and a J9 connector 54. The PRC-117G radio 50 also includes a hold up battery (HUB) housing 56 and a projection 58. The PRC-117G radio further includes four posts 60 that battery lids are configured to receive to attach the PRC-117G radio to a battery. The J10 battery connector 52, the J9 connector 54, the HUB housing 56, the projection 58, and the four posts 60 all protrude from the base of the PRC-117G radio 50. However, the four posts 60 and other protruding components are not in the same position for other radios typically used by military operators, so there is a need for a lid that is operable to support a plurality of post positions to enable a military operator to use a variety of radios during their military operations. In one embodiment, the projection 58 has a length of about 10 mm.

In one embodiment, a bottom of the military radio includes a J9 connector, a J10 connector, a J11 connector and/or a J12 connector.

In one embodiment, the present invention includes a battery housing including a lid, a gasket, a heat-dissipating layer, a base, and at least one locking latch. Preferably, the battery housing is configured to receive a plurality of radios that have different post positions. Advantageously, the battery lid enables military operators to use one lid to attach to a plurality of military radios, thereby preventing the military operators from having to carry and maintain multiple lids (or multiple batteries) during military operations and/or change lids during engagement. For example, the present invention prevents the military operators from having to carry multiple batteries during military operations (e.g., as would be required with a battery box).

Figure 3:
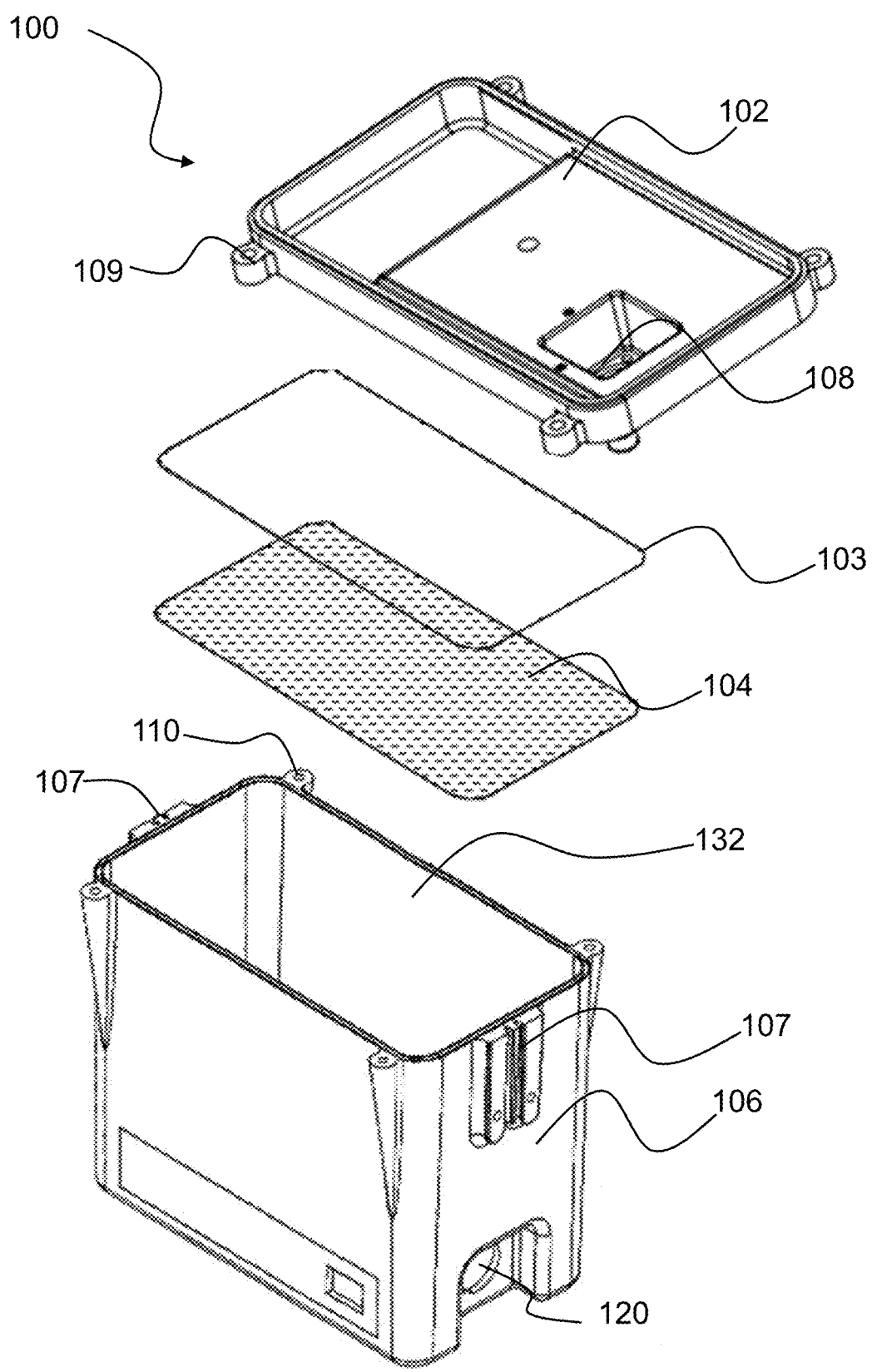
FIG. 3 illustrates an exploded view of an example of a battery into which the heat dissipating material is installed.

FIG. 3 illustrates an exploded view of an example of a housing of a battery including a heat-shielding or blocking and/or heat-dissipating material. The battery 100 is an example of equipment that may be used by military personnel. The battery 100 includes a lid 102, a gasket 103, a layer of a heat-shielding or blocking and/or heat-dissipating material 104, and a base 106. The base 106 has a mounting plaque 107 for mounting a latch on the base 106. As previously described, the latch is preferably a locking latch. Preferably, in one embodiment, the battery includes two mounting plaques and two latches. The base 106 has a recessed hole 120 for a connector on the base 106. In a preferred embodiment, the base 106 has a recessed hole 120 for a connector on both sides of the base 106. Advantageously, this embodiment provides flexibility of cable positioning by preventing interference between the cable and an antenna of the radio. Additionally, it prevents having a single point of failure for connectors. The recessed hole 120 provides for a reduced side profile when used with a cable having right angle connector.

The lid 102 includes a plurality of holes 109 to attach the lid 102 to the base 106. The base 106 includes a plurality of corresponding holes 110 to attach the lid 102 to the base 106 of the housing. Screws (not shown) are placed through the plurality of holes 109 and the plurality of corresponding holes 110 to attach the lid 102 to the base 106. The lid 102 includes a recessed hole 108 for mounting a military specification (MIL-SPEC) radio connector.

In one embodiment, the lid 102 is configured to compress the gasket 103. The gasket is positioned in a trough along the edges of the battery base 106. In another embodiment, the gasket is formed of silicone or rubber. Advantageously, the gasket is configured to protect against water ingress, dust ingress, and other environmental elements when the lid is secured to the base.

The battery base 106 for removably holding at least one battery cell is coated with a paint 132 for reducing electromagnetic interference. In a preferred embodiment, the paint 132 includes copper. Although the base 106 of the battery 100 is coated with the paint 132, which functionally protects the bottom and sides of the battery from external heat, the top of the battery is exposed to external heat when attached to heat generating equipment (e.g., radio).

Figure 4:
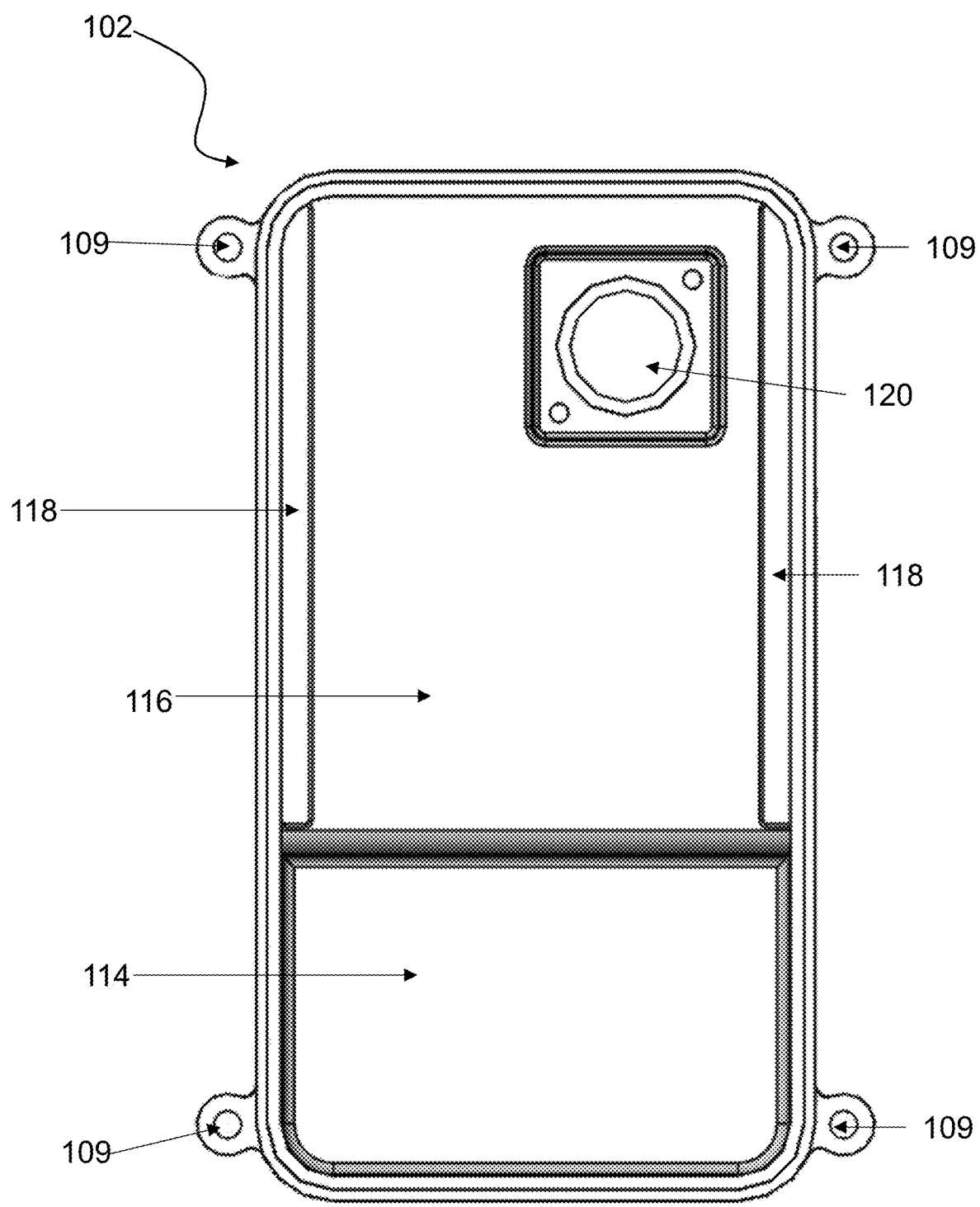
FIG. 4 illustrates a top perspective view of the battery lid.

In one embodiment, as shown in FIG. 4, the lid 102 includes, but is not limited to, a recessed portion 114, an elevated portion 116 including at least two channels 118, a recessed hole 108, and a plurality of holes 109. The lid 102 is configured to attach to the base 106 of the battery 100. In one embodiment, the elevated portion 116 is between about 70 mm to about 100 mm in length. In another embodiment, the recessed portion 114 is between about 70 mm to about 100 mm in length. In one embodiment, the recessed portion 114 has a depth of at least 10 mm relative to a top point of the lid 102. Another problem addressed by the present invention is the positioning of the protrusions of military radios. Radio manufacturers will occasionally move the position of the protrusions (e.g., HUB battery housing, connectors (e.g., J9 connector, J10 connector, J11 connector, J12 connector)), which is a problem if a lid does not have the space to receive the new position of the protrusions. Advantageously, the recessed portion of the present invention is designed so the protrusions do not interfere with the attachment of the lid to the bottom of the radio.

The elevated portion 116 includes at least two channels 118. The at least two channels include, but are not limited to, a length, a width, and a depth. In one embodiment, the at least two channels are the same length as the elevated portion. Alternatively, the at least two channels have a length less than a length of the elevated portion. In yet another embodiment, the at least two channels are the same depth as the recessed portion. Alternatively, the at least two channels are at a depth between the recessed portion and the elevated portion. In one embodiment, the at least two channels include a length between about 70 mm to about 100 mm, a width between about 2 mm to about 5 mm, and a depth between about 2 mm to about 4 mm. In one embodiment, the at least two channels include a length of about 88.9 mm (3.5 inches), a width of about 3.175 mm (0.125 inches), and a depth of about 3.175 mm (0.125 inches). The at least two channels preferably have a length greater than about 15 mm. In a more preferred embodiment, the at least two channels have a length greater than about 30 mm.

In another embodiment, the at least two channels are positioned on opposite sides of the lid. For example, and not limitation, the lid is a substantially rectangular shape and the at least two channels are preferably positioned on the sides with the greatest length. Alternatively, the at least two channels are positioned on the sides with the shortest length. In yet another embodiment, the at least two channels are positioned on adjacent sides. For example, and not limitation, the battery lid is a substantially rectangular shape. The at least two channels are positioned such that one channel is positioned along the side with the greatest length and the other channel is positioned along the side with the shortest length.

In one embodiment, each channel of the at least two channels includes a stabilizing component. The stabilizing component is configured to prevent the post from moving in a side-to-side motion once the post is inserted into the channel. For example, and not limitation, the stabilizing component includes silicone and/or rubber bumps.

Figure 5A:
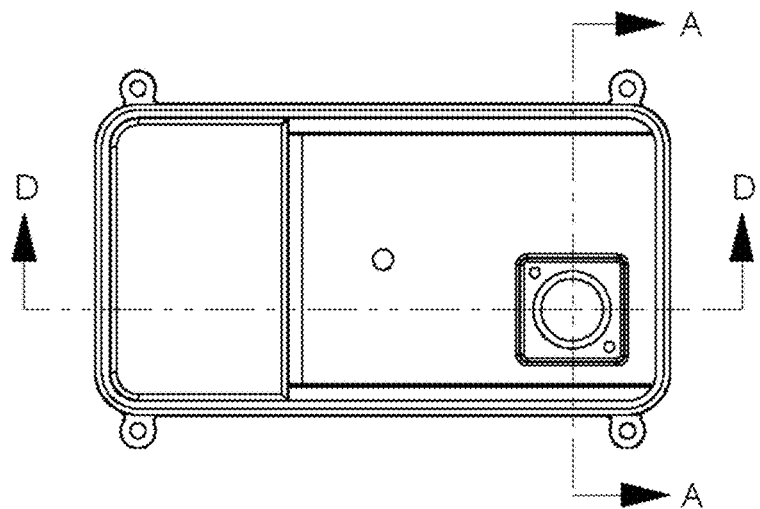
FIG. 5A illustrates a top perspective view of the battery lid.
Figure 5B:
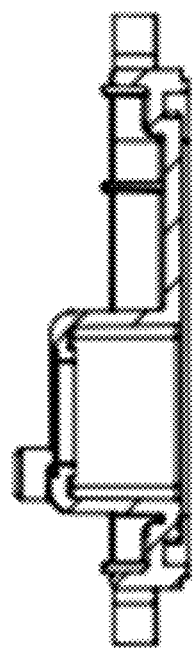
FIG. 5B illustrates a cross-section view of the battery lid.
Figure 5C:
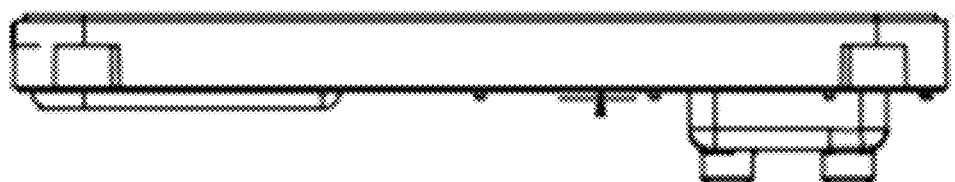
FIG. 5C illustrates a side perspective view of the battery lid.
Figure 5D:
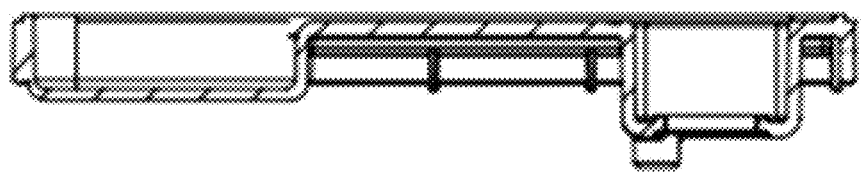
FIG. 5D illustrates another cross-section view of the battery base.
Figure 6B:
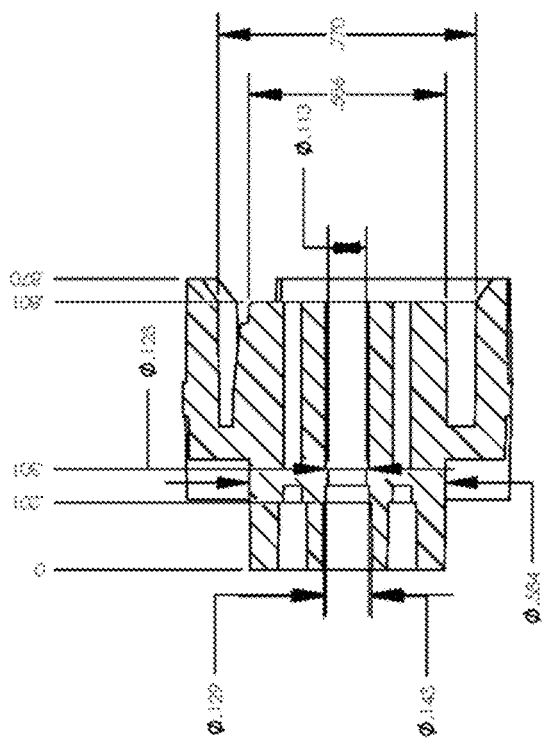
FIG. 6B illustrates a cross-section view of a BA-5590 female connector.
Figure 6A:
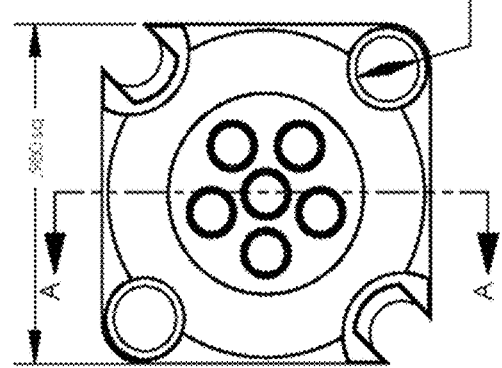
FIG. 6A illustrates a top perspective view of a BA-5590 female connector.
Figure 6D:
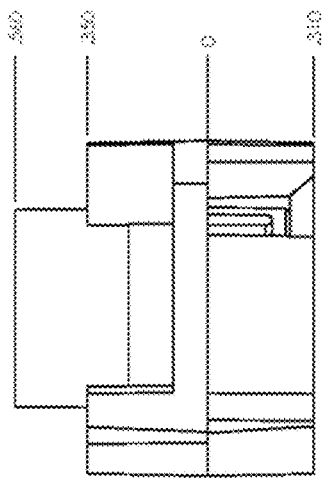
FIG. 6D illustrates a side perspective view of a BA-5590 female connector.
Figure 6C:
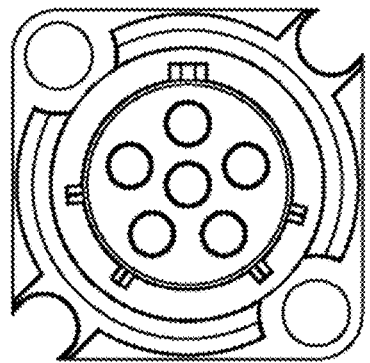
FIG. 6C illustrates a bottom perspective view of a BA-5590 female connector.

FIG. 5A illustrates a top perspective view of a battery lid according to one embodiment of the present invention. FIG. 5B illustrates a cross-section view of the battery lid. FIG. 5C illustrates a side perspective view of the battery lid. FIG. 5D illustrates another cross-section view of the battery lid.

The recessed hole 108 is configured to receive and/or mount a connector (e.g., a MTh-SPEC connector). In one embodiment, the connector is a BA-5590 female connector. Preferably, the battery lid is configured to receive a connector operable to connect to a military radio (e.g., a corresponding MIL-SPEC connector). FIGS. 6A-6D show views of one embodiment of a BA-5590 connector. In a preferred embodiment, the BA-5590 female connector is installed in the recessed hole of the lid. The base of the connector in FIGS. 6A-6D is about 6.35 mm (0.25 inches) shorter than other similar female connectors, which results in less wasted space inside the battery housing. The shorter connector allows the base to be about 6.35 mm (0.25 inches) shorter, which results in cost, weight, and volume savings over the prior art.

In one embodiment, the battery lid is formed of a plastic material and/or a carbon fiber (e.g., acrylonitrile butadiene styrene (ABS) infused carbon fiber). The plastic material includes, but is not limited to, a polycarbonate, a styrene (e.g., acrylonitrile butadiene styrene (ABS)), polyvinyl chloride, acrylic, or a combination thereof. In a preferred embodiment, the plastic material includes a polycarbonate and a styrene (e.g., ABS). In yet another embodiment, the plastic material is CYCOLOY CX7240 or CYCOLOY C6600. In another embodiment, the plastic material is BAYBLEND FR-110. The plastic material is preferably an injection moldable plastic material. In one embodiment, the plastic material is non-chlorinated and/or non-brominated. In a preferred embodiment, the plastic material is flame retardant.

For example and not limitation, in one embodiment, the properties of the battery lid material includes, but are not limited to, a flame rating of VO at 0.75 mm (vertical burning test), 5VA at 3.0 mm (vertical burning test), and 5VB at 0.5 mm (vertical burning test) according to (Underwriters Laboratories) UL 94 standard for flammability of plastic materials, 2013, which is incorporated by reference herein in its entirety. The battery lid material further includes a density of about 1.20 g/cm3, according to ASTM Standard D792, 2010 for Density and Specific Gravity of Plastics, which is incorporated by reference herein in its entirety. For example, and not limitation, the density of the battery lid material is 1.19 g/cm3. According to UL Standard 746C, 2018 (Polymeric Materials—Use in Electrical Equipment Evaluations), which is incorporated by reference herein in its entirety, the battery lid material has an outdoor suitability of f2, so the battery lid material is operable for ultraviolet or water immersion. Alternatively, the battery lid material has an outdoor suitability of f1, so the battery lid material is operable for ultraviolet and water immersion.

In a preferred embodiment, the battery lid is a medium shade of color (e.g., a medium shade of green) that is light enough not to retain heat and dark enough not to be easily visible at night. An example of a medium shade of color is #788270 hex color, which has cyan, magenta, yellow, and black (CMYK) percentages of 8%, 0%, 14%, and 49%, respectively. In one embodiment, the color has a black percentage of between about 40% and about 60%. In one embodiment, the finish is matte to reduce glare.

In one embodiment, the battery includes a locking latch configured to attach to a corresponding catch on a military radio. In one embodiment, the locking latch includes a draw latch. The locking latch is configured to maintain a seal (e.g., a spring compression seal) between the radio and the lid and protect against the ingress of dust and water. In one embodiment, the seal complies with MIL-G-83528B (July 1992 including Amendment 1 dated June 1993) and/or MIL-DTL-83528G (January 2017), each of which is incorporated herein by reference, which provide requirements for electrically-conductive silicone and electrically-conductive fluorosilicone gaskets to provide shielding against electromagnetic interference (EMI) and radio frequency interference (RFI). For example, and not limitation, in another embodiment, the latch includes, but is not limited to, an over center latch, an under center latch, a twist latch, a rubber t-handle latch, a hood latch, a living hinge latch, a hasp, a hook latch, and/or an eye latch. In one embodiment, the twist latch includes a butterfly twist latch. Alternatively, the battery includes a non-locking latch. In yet another embodiment, the locking latch includes a quick-release latch. Advantageously, the quick-release latch improves the speed with which a military operator is able to swap batteries, thereby reducing the amount of time that a military operator is unable to use the radio and unable to maintain communications.

In one embodiment, the battery base is formed of a plastic material and/or carbon fiber (e.g., ABS infused carbon fiber). The plastic material includes, but is not limited to, a polycarbonate, a styrene (e.g., ABS), acrylic, polyvinyl chloride, or a combination thereof. In a preferred embodiment, the plastic material includes a polycarbonate and a styrene. In one embodiment, the plastic material is CYCOLOY CX7240 or CYCOLOY C6600. In another embodiment, the plastic material is BAYBLEND FR-110. The plastic material is preferably an injection moldable plastic material. In one embodiment, the plastic material is non-chlorinated and/or non-brominated. In a preferred embodiment, the plastic material is flame retardant.

In one embodiment, the battery lid is positioned above a heat-dissipating layer (shown as 104 in FIG. 3). The present invention provides a material for 1) reducing or eliminating heat exposure from external objects or other heat-producing devices and/or 2) dissipating heat from at least one battery. The heat blocking or shielding and/or heat-dissipating material is incorporated into the battery. Advantageously, the heat blocking or shielding and/or heat-dissipating material protects the battery cells from a malfunctioning and/or overheating radio.

Surprisingly, one embodiment of the heat blocking or shielding and/or heat-dissipating material layer was discovered when it was in a person's hand but they were not burned by a heat gun when holding the material in hand, between the heat gun and skin. It was later tested and proved completely heat-resistant, heat-shielding, and/or heat-dissipating up to temperatures of heat guns (up to about 540° C.), propane torches (up to about 1995° C.), and oxygen-fed torches (up to about 2820° C.). These surprising test results combined with other trials generated the embodiments of the present invention and the particular examples that are described herein, in particular for linings or coatings that are constructed and configured especially for heat blocking or shielding and/or heat-dissipating material layer or coating applied to objects for protecting an article from any external heat source, as well as dissipating heat produced by heat-producing devices and their batteries.

The heat-dissipating layer is operable to be any material that is suitable for dissipating heat from electronic devices and/or clothing. The heat-dissipating layer is operable to be from about 20 μm thick to about 350 μm thick in one example. In particular embodiments, the heat-dissipating layer has a thickness ranging from about 1 mil to about 6 mil, including, but not limited to, 1, 2, 3, 4, 5, and 6 mil, or about 25 μm to about 150 μm, including, but not limited to, 25, 50, 75, 100, 125, and 150 μm. Examples of the heat-dissipating layer include anti-static, anti-radio frequency (RF), and/or anti-electromagnetic interference (EMI) materials, such as copper shielding plastic or copper particles bonded in a polymer matrix, as well as anti-tarnish and anti-corrosion materials. A specific example of the heat-dissipating layer is the anti-corrosive material used in Corrosion Intercept Pouches, catalog number 034-2024-10, available from University Products Inc. (Holyoke, Mass.). The anti-corrosive material is described in U.S. Pat. No. 4,944,916 to Franey, which is incorporated by reference herein in its entirety. Such materials are operable to include copper shielded or copper impregnated polymers including, but not limited to, polyethylene, low-density polyethylene, high-density polyethylene, polypropylene, and polystyrene. In another embodiment, the heat shielding or blocking and/or heat-dissipating layer is a polymer with aluminum and/or copper particles incorporated therein. In particular, the surface area of the polymer with aluminum and/or copper particles incorporated therein preferably includes a large percent by area of copper and/or aluminum. By way of example and not limitation, the surface area of the heat-dissipating layer includes about 25% by area copper and/or aluminum, 50% by area copper and/or aluminum, 75% by area copper and/or aluminum, or 90% by area copper and/or aluminum. In one embodiment, the heat shielding or blocking and/or heat-dissipating layer is substantially smooth and not bumpy. In another embodiment, the heat shielding or blocking and/or heat-dissipating layer is not flat but includes folds and/or bumps to increase the surface area of the layer. Alternatively, the heat-shielding or blocking and/or heat-dissipating layer includes a fabric having at least one metal incorporated therein or thereon. The fabric further includes a synthetic component, such as by way of example and not limitation, a nylon, a polyester, or an acetate component. Preferably, the at least one metal is selected from the group consisting of copper, nickel, aluminum, gold, silver, tin, zinc, or tungsten.

Figure 7:
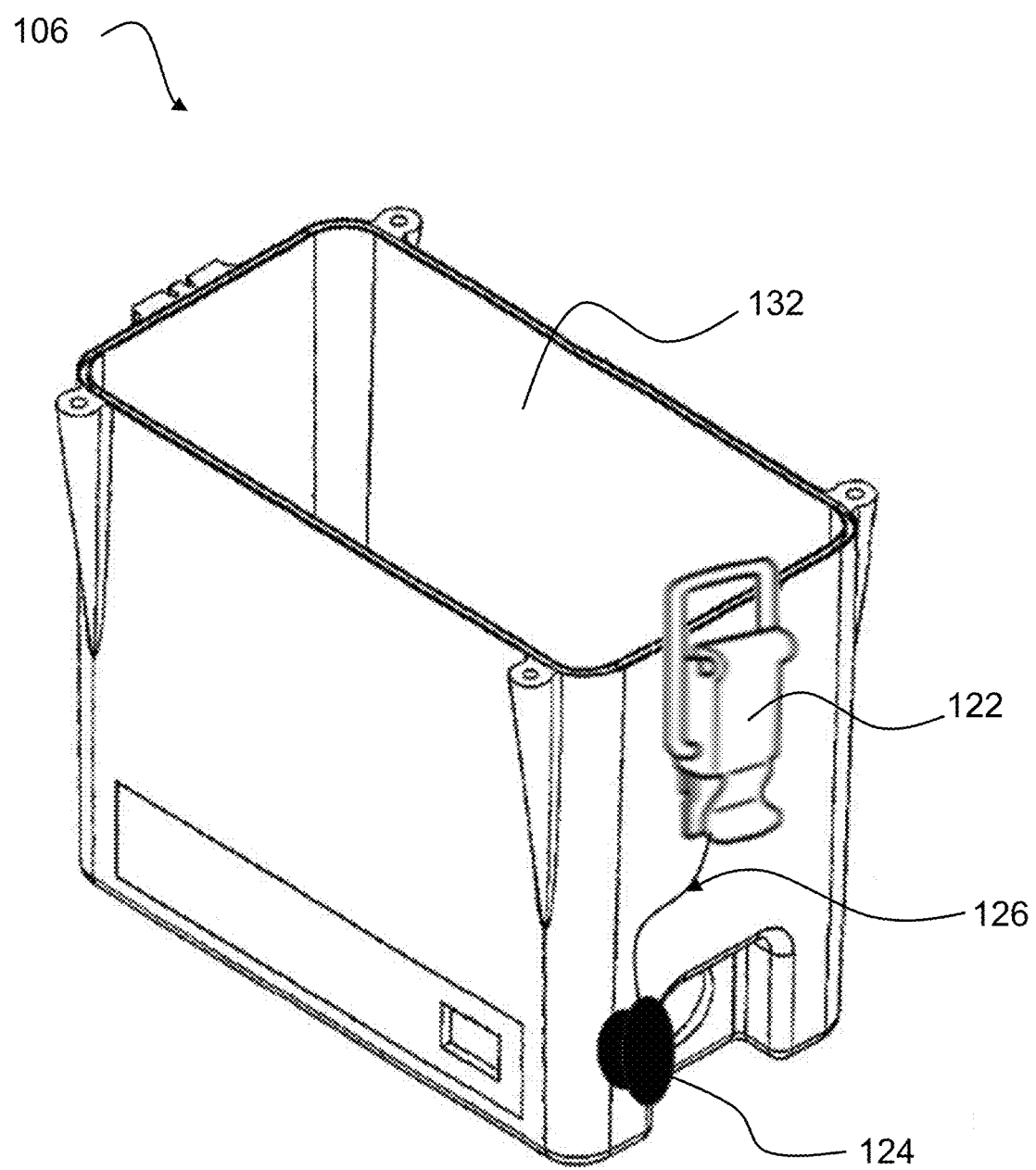
FIG. 7 illustrates a view of an example of a battery base.

FIG. 7 illustrates a view of an example of a battery base 106. The base 106 is shown with a latch 122. The latch 122 is operable to attach the battery to a military radio (e.g., AN/PRC-117G) with a corresponding catch. A dust cap 124 is attached to the battery base 106 via a lanyard 126 attached to the mounting plaque of the latch 122. The length of the lanyard 126 is such that no part of the dust cap 124 is capable of moving underneath the battery. Batteries often have the dust cap attached to the housing via a dress nut, which allows the dust cap to move underneath the battery. When the dust cap is underneath the battery, the battery (and any equipment attached to the battery) may become unstable and tip over. If the dust cap is underneath the battery, it may lead to the dust cap being torn from the housing. The battery connector would no longer be protected from dust and other environmental contaminants, causing battery failure in the field.

The latch 122 is preferably a locking latch. In one embodiment, the locking latch includes a draw latch. The latch is configured to maintain a seal between the radio and battery and protect against the ingress of environmental elements (e.g., dust, water). For example, and not limitation, in another embodiment, the latch includes, but is not limited to, an over center latch, an under center latch, a twist latch, a rubber t-handle latch, a hood latch, a living hinge latch, a hasp, a hook, and/or an eye latch. In one embodiment, the twist latch includes a butterfly twist latch.

Figure 8:
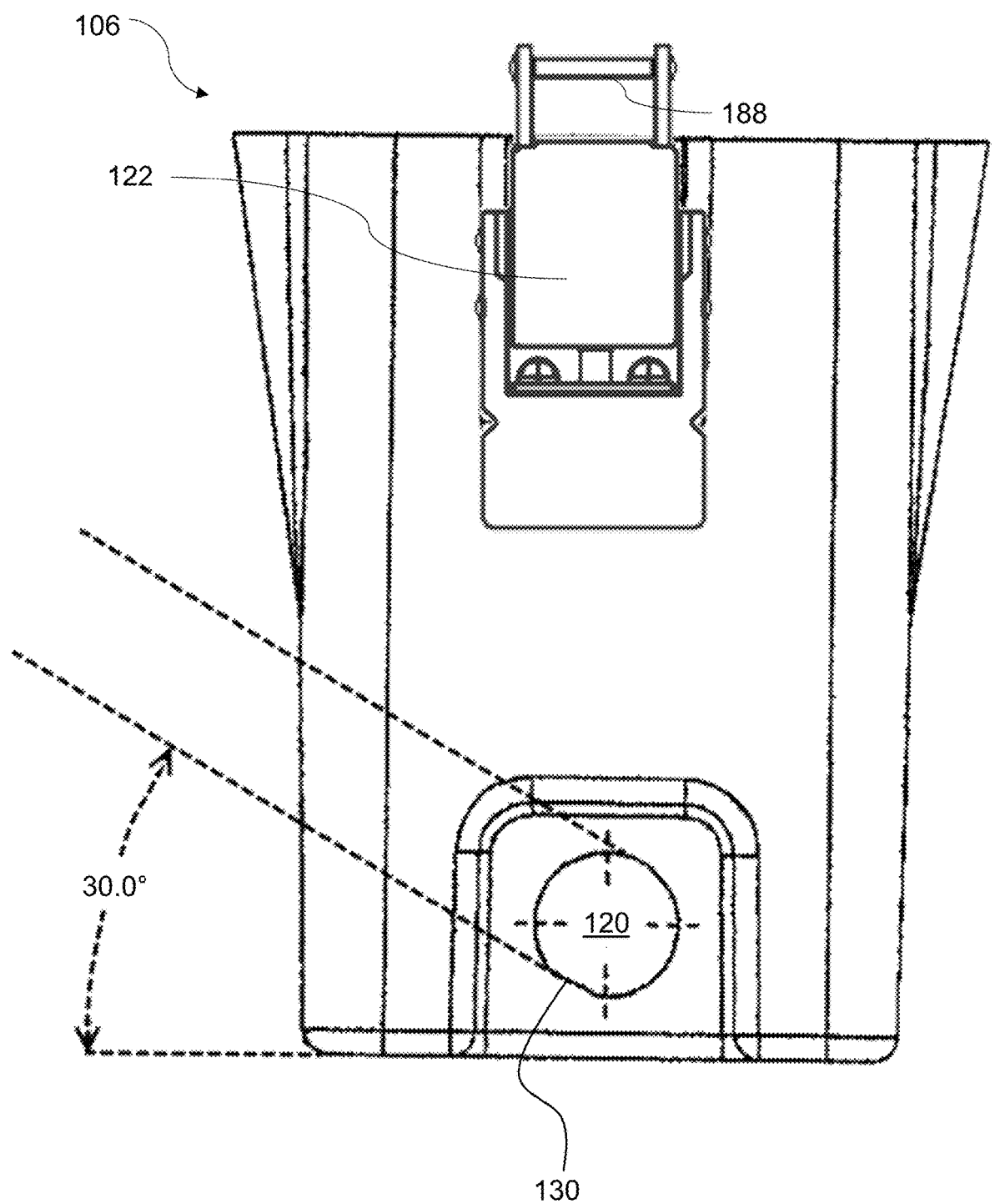
FIG. 8 illustrates another view of an example of a battery base.

FIG. 8 illustrates another view of an example of a battery base including a latch. The latch 122 shown in FIG. 8 is a draw latch with a pressure bar release and a thumb tab. In one embodiment, the latch 122 includes a loop 188 to attach the battery to the military radio with the corresponding catch. Advantageously, the latch 122 shown in FIG. 8 is a locking latch. An example of a locking latch includes, but is not limited to, a NIELSEN HARDWARE 83314-42LALB Series Latch. The pressure bar release is configured to attach to a corresponding catch on a radio and to release when pressure is applied to the center of the latch. The latch 122 is operable to be mounted on the mounting plaque. Alternatively, the battery includes a non-locking latch.

As previously described, the battery base for removably holding at least one battery cell is coated with a paint for reducing electromagnetic interference. Although the base of the battery is coated with the paint, which functionally protects the bottom and sides of the battery from external heat, the top of the battery is exposed to external heat when attached to heat generating equipment (e.g., radio). Since external heat can damage the battery and/or cause it to overheat, the heat-shielding or blocking and/or heat-dissipating material layer or coating is functionally constructed and configured within the interior of the housing or base to protect the removable battery cells disposed therein. In this particular example, the radio in constant use generates a significant heat profile and the heat-shielding material is operable to block that external heat emanating from the radio. The material is further functional to dissipate heat generated by the at least one battery during operation of the radio, which draws power from the at least one battery, and reduces the heat profile of the at least one battery cell disposed within the housing or base. Reducing the exposure of the battery cells to heat results in longer and more reliable battery performance.

In another example of embodiments of the present invention, the heat-shielding or blocking and/or heat-dissipating material completely covers the interior of a housing having a plurality of battery cells removably disposed therein. Other examples include a heat-shielding or blocking and/or heat-dissipating material layer having anti-static, anti-radio frequency (RF), anti-electromagnetic interference (EMI), anti-tarnish, and/or anti-corrosion materials and properties that effectively protect battery-operated devices and/or the batteries that power them from damage or diminished operation.

The battery base includes a plurality of sealed battery cells or individually contained battery cells, i.e., batteries with their own casings, removably disposed therein. In a preferred embodiment, the battery cells are electrochemical battery cells, and more preferably, include lithium ion rechargeable batteries. In one embodiment, the battery cells are lithium iron phosphate (LFP). In another embodiment, the battery cells are all-solid-state cells (e.g., using glass electrolytes and alkaline metal anodes), such as those disclosed in U.S. Publication Nos. 20180013170, 20180102569, 20180097257, 20180287150, 20180305216, 20180287222, 20180127280, 20160368777, and 20160365602, each of which is incorporated herein by reference in its entirety. In one embodiment, the battery cells are 18350, 14430, 14500, 18500, 16650, 18650, 21700, 4680, or 26650 cylindrical cells. The plurality of battery cells may be constructed and configured in parallel, series, or a combination. Preferably, the plurality of battery cells is removably disposed within the base. For example, the plurality of battery cells can be replaced if they no longer hold a sufficient charge. In an alternative embodiment, one or more of the plurality of battery cells is sealed within the base. In another embodiment, the lid is permanently secured to the base.

As shown in FIG. 8, in a preferred embodiment, the recessed hole 120 includes a flat side 130 for installing a connector with a keyway. The flat side requires that the connector only be installed in one orientation. Additionally, a right-angle cable is used to connect the battery to external power consuming devices and/or external power sources. As previously described, the connector is included in a recessed portion. Advantageously, the recessed portion protects the connector from being broken. Many prior art batteries include a connector as a protrusion from the battery base, which is disadvantageous because it increases the likelihood the connector will sustain damage. Another advantage of using a recessed portion is that a right-angle cable mated to the connector reduces a side profile in comparison to a prior battery without a recessed portion. The keyway ensures that the right-angle cable does not interfere with latches used to attach the battery to the radio by forcing the orientation of the connector of the right-angle cable to be positioned such that the cable angles away from the latches. The keyway in FIG. 8 forces the cable to a 30.0° angle relative to the base. In another embodiment, the keyway forces the cable at an angle between 5° and 15° away from the latch. Other angles are compatible with the present invention. Advantageously, including a connector on both sides of the battery base eliminates a single point of failure. For example, if a first connector on a first side of a battery no longer works, a second connector on a second side of a battery is still operable to provide power. Additionally, including a connector on both sides of the battery base provides multiple positions for antenna placement (e.g., according to operator preference and/or mission requirements).

Figure 9:
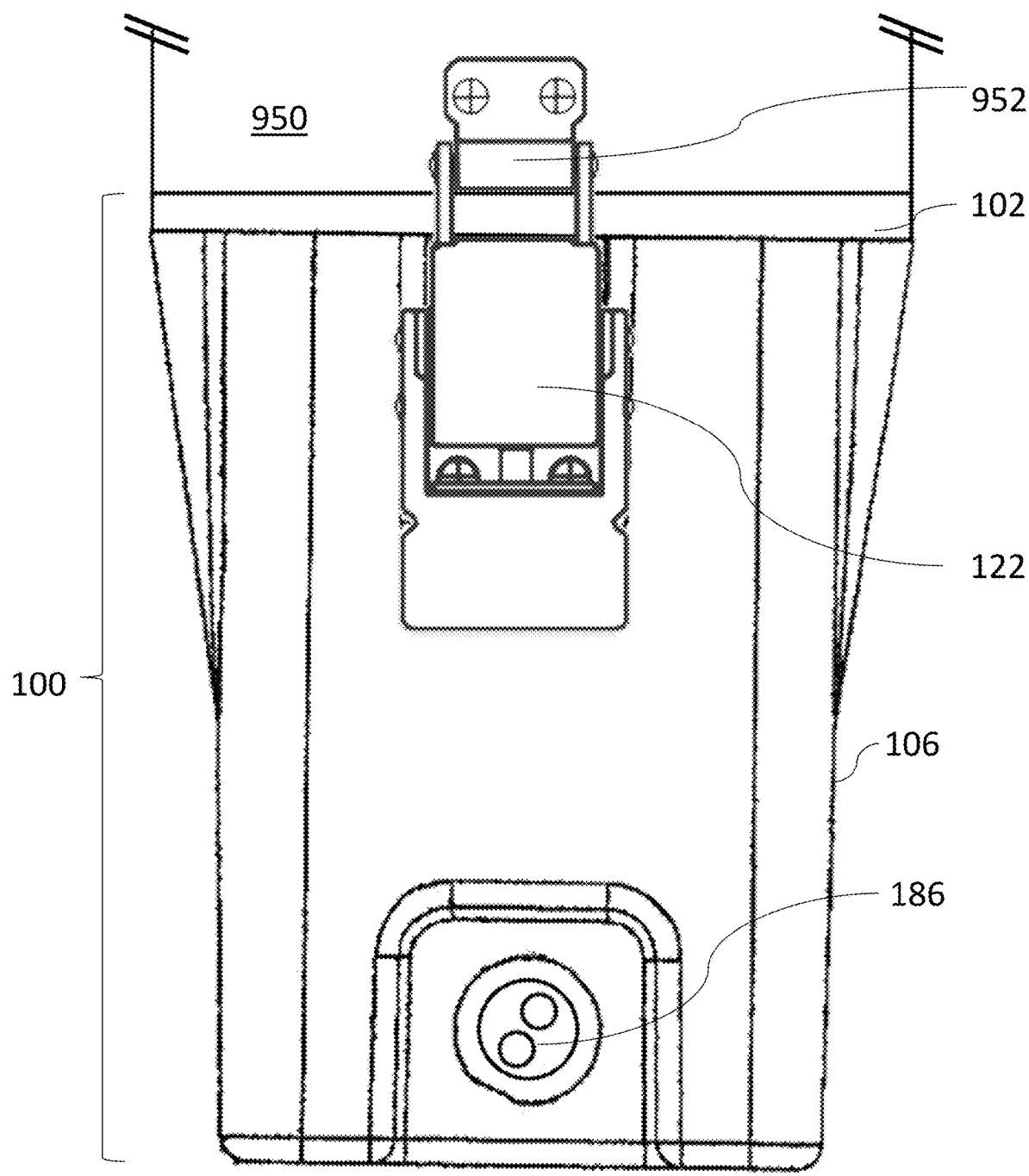
FIG. 9 illustrates one embodiment of a battery attached to military radio.

FIG. 9 illustrates one embodiment of a battery 100 attached to military radio 950. The battery includes a lid 102 and a base 106. The base 106 includes a latch 122 and a connector 186. The connector preferably includes the keyway as described above. The latch 122 preferably includes a loop to attach the battery 100 to the military radio 950 with a corresponding catch 952.

Figure 10A:
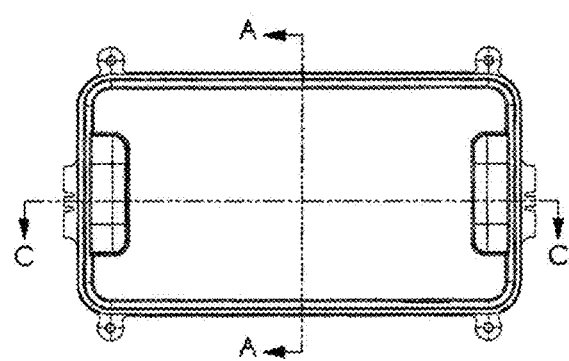
FIG. 10A illustrates a top perspective of the battery base.
Figure 10B:
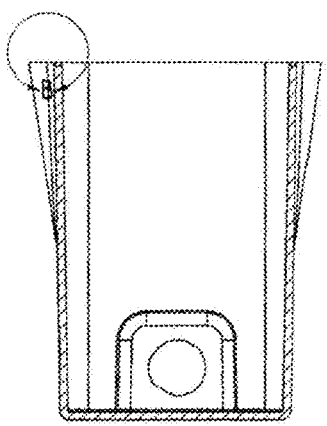
FIG. 10B illustrates a cross-section view of the battery base.
Figure 10C:
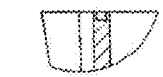
FIG. 10C illustrates a detail view of a part of the cross-section view of the battery base shown in FIG. 10B
Figure 10D:
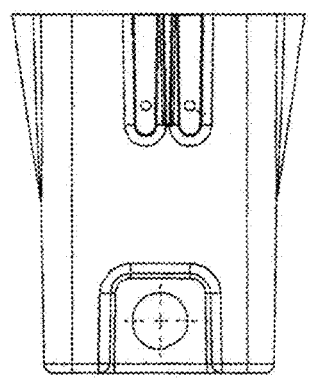
FIG. 10D illustrates a side perspective of the base.
Figure 10E:
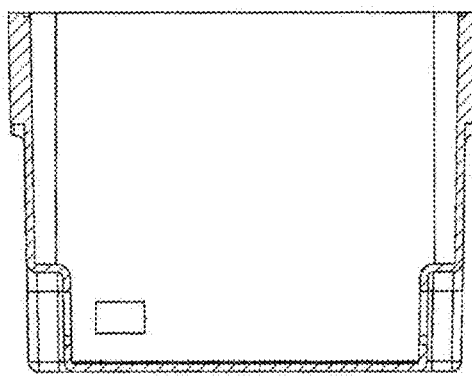
FIG. 10E illustrates another cross-section view of the battery base.
Figure 10F:
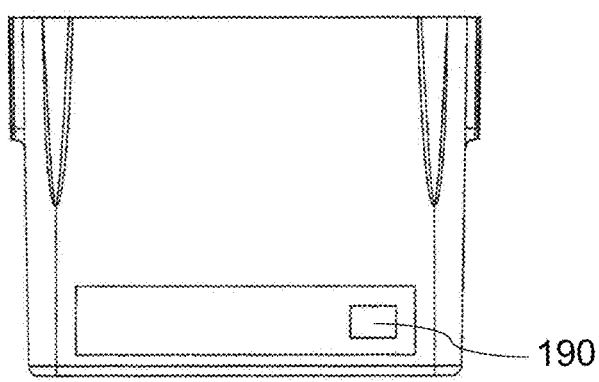
FIG. 10F illustrates another side perspective view of the battery base.

FIG. 10A illustrates a top perspective view of a battery base for mating with a military radio. FIG. 10B illustrates a cross-section view of the battery base. FIG. 10C illustrates a detail view of a part of the cross-section view of the battery base shown in FIG. 10B. FIG. 10D illustrates a side perspective view of the battery base. FIG. 10E illustrates another cross-section view of the battery base. FIG. 10F illustrates another side perspective view of the battery base. In one embodiment, the battery base includes window 190 for an indicator operable to identify a state of charge of the battery.

The battery is configured to attach to a military radio. The military radio includes, but is not limited to, an AN/PRC-117G radio, an AN/PRC-160 radio, an AN/PRC-167 radio, a RF-7800H-MP radio, a RF-7800M-MP radio, a RF-7800-RC radio, or a RF-7800-RT intelligence radio.

In one embodiment, the battery further includes a printed circuit board (PCB). In another embodiment, the PCB is disposed within the interior of the base. In yet another embodiment, the PCB includes control electronics configured to determine a state of charge of the battery and/or the radio attached to the battery lid.

In one embodiment, the battery has a weight of less than about 1.5 kg (3.3125 pounds). In another embodiment, the battery has a weight of less than 1.19 kg (2.625 pounds). The weight includes the lid, the base, the plurality of electrochemical cells, the at least two latches, and the connectors. The battery is operable to provide at least 12 hours of run time on the military radio. In one embodiment, the battery provides a run time density of at least about 8 hours/kg. In another embodiment, the battery provides a run time density of at least about 10 hours/kg. In a preferred embodiment, the battery provides a run time density of at least about 8.67 hours/kg. In another preferred embodiment, the battery provides a run time density of at least about 10.9 hours/kg.

Advantageously, the present invention provides a run time density greater than those in the prior art. As previously described, a typical battery eliminator has a weight of (e.g., 2.27-4.54 kg (5-10 pounds) and provides a run time of about 15-30 minutes. The battery eliminator provides a run time density no greater than 0.22 hours/kg. Additionally, as previously described, a battery box has a total of weight (including the battery inside the battery box) of about 1.13-1.59 kg (2.5-3.5 pounds) and provides a run time of about 9-10 hours. Thus, the battery box provides a run time density no greater than 8.85 hours/kg.

Figure 11:
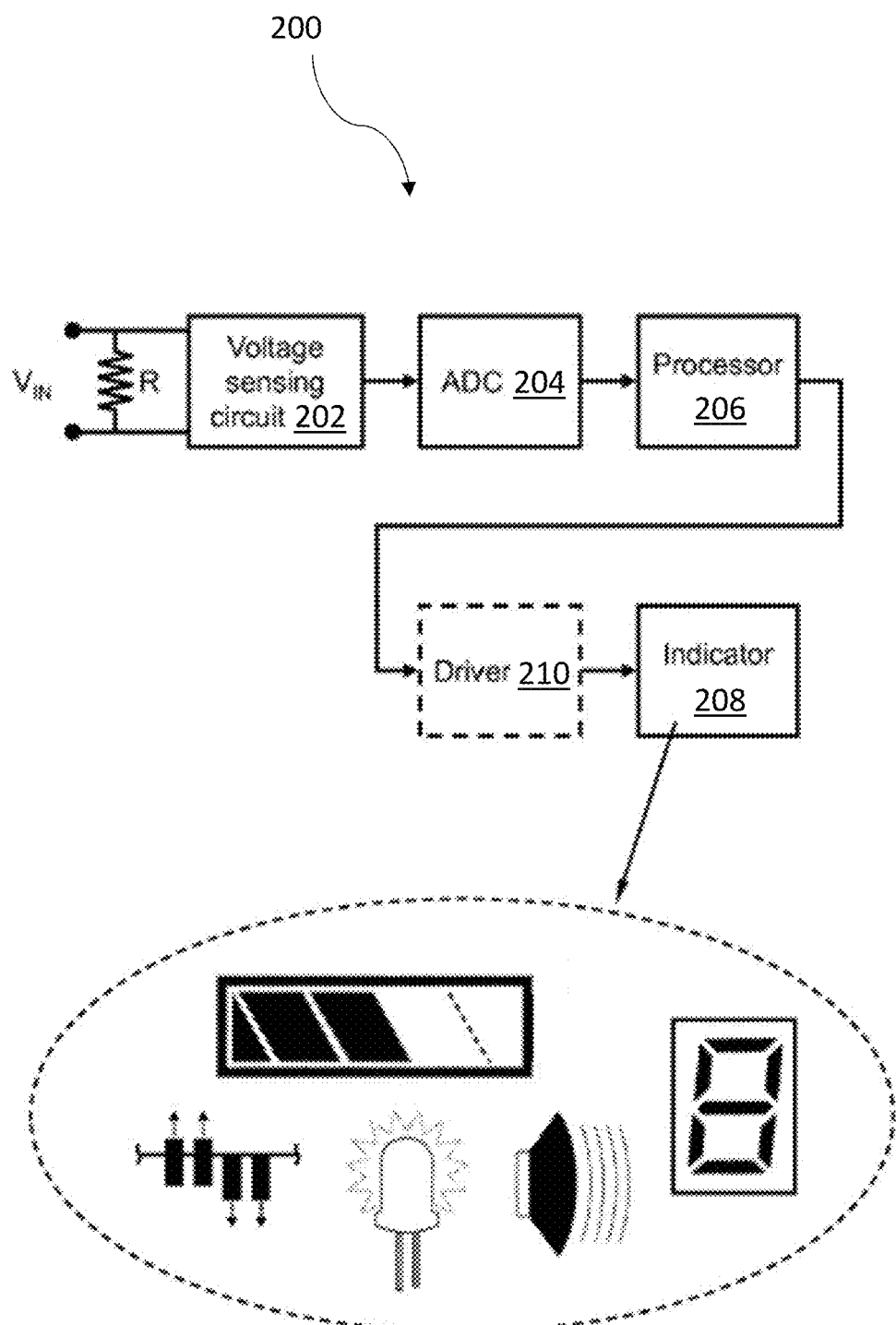
FIG. 11 illustrates a block diagram of one embodiment of the control electronics for a state of charge (SOC) indicator incorporated into the battery.

FIG. 11 illustrates a block diagram of one embodiment of the control electronics for a state of charge indicator incorporated into the battery. In one embodiment, the control electronics 200 includes a voltage sensing circuit 202, an analog-to-digital converter (ADC) 204, a processor 206, an indicator 208, and optionally a driver 210.

The voltage sensing circuit 202 is operable to be any standard voltage sensing circuit, such as those found in volt meters. An input voltage $V_{IN}$ is supplied via the power BUS. In one embodiment, the voltage sensing circuit 202 is designed to sense any direct current (DC) voltage in the range of from about 0 volts DC to about 50 volts DC. In one embodiment, the voltage sensing circuit 202 includes standard amplification or de-amplification functions for generating an analog voltage that correlates to the amplitude of the input voltage $V_{IN}$ that is present. The ADC 204 receives the analog voltage from the voltage sensing circuit 202 and performs a standard analog-to-digital conversion.

The processor 206 manages the overall operations of the SOC indicator. The processor 206 is any controller, microcontroller, or microprocessor that is capable of processing program instructions.

The indicator 208 is any visual, audible, or tactile mechanism for indicating the state of charge of the battery and/or radio. In one embodiment, the indicator is positioned on the battery base. Alternatively, in another embodiment, the indicator is positioned on the battery lid. A preferred embodiment of a visual indicator is at least one 5-bar liquid crystal display (LCD), wherein five bars flashing or five bars indicates greatest charge and one bar or one bar flashing indicates least charge. Another example of a visual indicator is at least one seven-segment numeric LCD, wherein the number 5 flashing or the number 5 indicates greatest charge and the number 1 or the number 1 flashing indicates least charge. Alternatively, the at least one LCD displays the voltage of the battery and/or radio as measured by the control electronics.

The at least one LCD is preferably covered with a transparent material. In a preferred embodiment, the cover is formed of a clear plastic (e.g., poly(methyl methacrylate)). This provides an extra layer of protection for the at least one LCD, much like a screen protector provides an extra layer of protection for a smartphone. This increases the durability of the at least one LCD.

Alternatively, the visual indicator is at least one LED. One preferred embodiment of a visual indicator is a set of light-emitting diodes (LEDs) (e.g., 5 LEDs), wherein five lit LEDs flashing or five lit LEDs indicates greatest charge and one lit LED or one lit LED flashing indicates least charge. In one embodiment, the LEDs are red, yellow, and/or green. In one example, two of the LEDs are green to indicate a mostly full charge on the battery and/or radio, two of the LEDs are yellow to indicate that charging will soon be required for the battery and/or radio, and one LED is red to indicate that the radio and/or battery is almost drained. In a preferred embodiment, at least three bars, lights, or numbers are used to indicate the state of charge.

In one embodiment, the at least one LED is preferably covered with a transparent material. In a preferred embodiment, the cover is formed of a clear plastic (e.g., poly(methyl methacrylate)). This provides an extra layer of protection for the at least one LED. This increases the durability of the at least one LED.

One example of an audible indicator is any sounds via an audio speaker, such as beeping sounds, wherein five beeps indicates greatest charge and one beep indicates least charge. Another example of an audible indicator is vibration sounds via any vibration mechanism (e.g., vibration motor used in mobile phones), wherein five vibration sounds indicates greatest charge and one vibration sound indicates least charge.

One example of a tactile indicator is any vibration mechanism (e.g., vibration motor used in mobile phones), wherein five vibrations indicate greatest charge and one vibration indicate least charge. Another example of a tactile indicator is a set of pins that rise up and down to be felt in Braille-like fashion, wherein five raised pins indicates greatest charge and one raised pin indicates least charge.

In one example, the processor 206 is able to drive indicator 208 directly. In one embodiment, the processor 206 is able to drive directly a 5-bar LCD or a seven-segment numeric LCD. In another example, however, the processor 206 is not able to drive indicator 208 directly. In this case, the driver 210 is provided, wherein the driver 210 is specific to the type of indicator 208 used in the control electronics 200.

Additionally, the processor 206 includes internal programmable functions for programming the expected range of the input voltage $V_{IN}$ and the correlation of the value the input voltage $V_{IN}$ to what is indicated at the indicator 208. In other words, the discharge curve of the battery and/or radio can be correlated to what is indicated at indicator 208. In one embodiment, the processor 206 is programmed based on a percent discharged or on an absolute value present at the input voltage $V_{IN}$.

In one embodiment, the PCB includes at least one antenna, which allows the battery to send information (e.g., state of charge information) to at least one remote device (e.g., smartphone, tablet, laptop computer, satellite phone) and/or receive information (e.g., software updates, activation of kill switch) from at least one remote device. The at least one antenna provides wireless communication, standards-based or non-standards-based, by way of example and not limitation, radiofrequency, BLUETOOTH®, ZIGBEE®, WI-FI®, Near Field Communication (NFC), a Link 16 network, a mesh network, or similar standards used by a military or commercial entity. In one embodiment, the wireless communications are encrypted. In another embodiment, the antenna provides communications over the Secret Internet Protocol Router Network (SIPRNet).

Figure 12A:
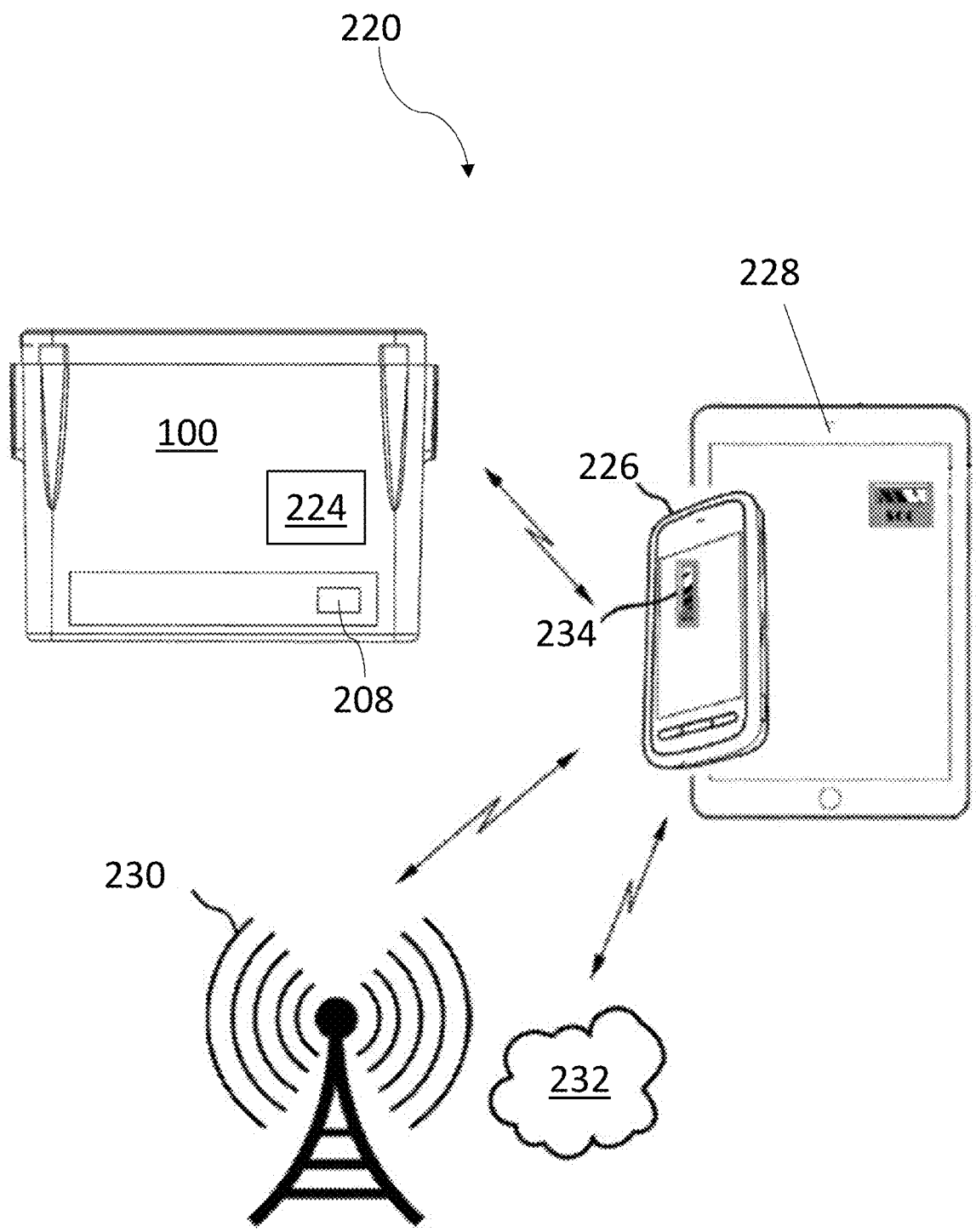
FIG. 12A illustrates a block diagram of an example of an SOC system that includes a mobile application for use with a battery.

FIG. 12A illustrates a block diagram of an example of an SOC system 220 that includes a mobile application for use with the battery. The SOC system 220 includes a battery 100 having a communications interface 224. The battery 100 includes an SOC indicator 208.

The communications interface 224 is any wired and/or wireless communication interface for connecting to a network and by which information may be exchanged with other devices connected to the network. Examples of wired communication interfaces include, but are not limited to, USB ports, RS232 connectors, RJ45 connectors, Ethernet, and any combinations thereof. Examples of wireless communication interfaces include, but are not limited to, an Intranet connection, Internet, ISM, BLUETOOTH® technology, WI-FI®, WIMAX®, IEEE 802.11 technology, radio frequency (RF), Near Field Communication (NFC), ZIGBEE®, Infrared Data Association (IrDA) compatible protocols, Local Area Networks (LAN), Wide Area Networks (WAN), Shared Wireless Access Protocol (SWAP), any combinations thereof, and other types of wireless networking protocols.

The communications interface 224 is used to communicate, preferably wirelessly, with at least one remote device, such as but not limited to, a mobile phone 226 or a tablet 228. The mobile phone 226 is operable to be any mobile phone that (1) is capable of running mobile applications and (2) is capable of communicating with battery. The mobile phone 226 can be, for example, an ANDROID™ phone, an APPLE® IPHONE®, or a SAMSUNG® GALAXY® phone. Likewise, the tablet 228 is operable to be any tablet that (1) is capable of running mobile applications and (2) is capable of communicating with the battery. The tablet 228 can be, for example, the 3G, 4G, or 5G version of the APPLE® IPAD®.

Further, in SOC system 220, the mobile phone 226 and/or the tablet 228 is in communication with a cellular network 230 and/or a network 232. The network 232 is operable to be any network for providing wired or wireless connection to the Internet, such as a local area network (LAN), a wide area network (WAN), a mesh network, SIPRNet, a Link 16 network, or other military or commercial network.

An SOC mobile application 234 is installed and running at the mobile phone 226 and/or the tablet 228. The SOC mobile application 234 is implemented according to the type (i.e., the operating system) of mobile phone 226 and/or tablet 228 on which it is running. The SOC mobile application 234 is designed to receive SOC information from the battery and/or radio. The SOC mobile application 234 indicates graphically, audibly, and/or tactilely, the state of charge to the user (not shown).

Figure 12B:
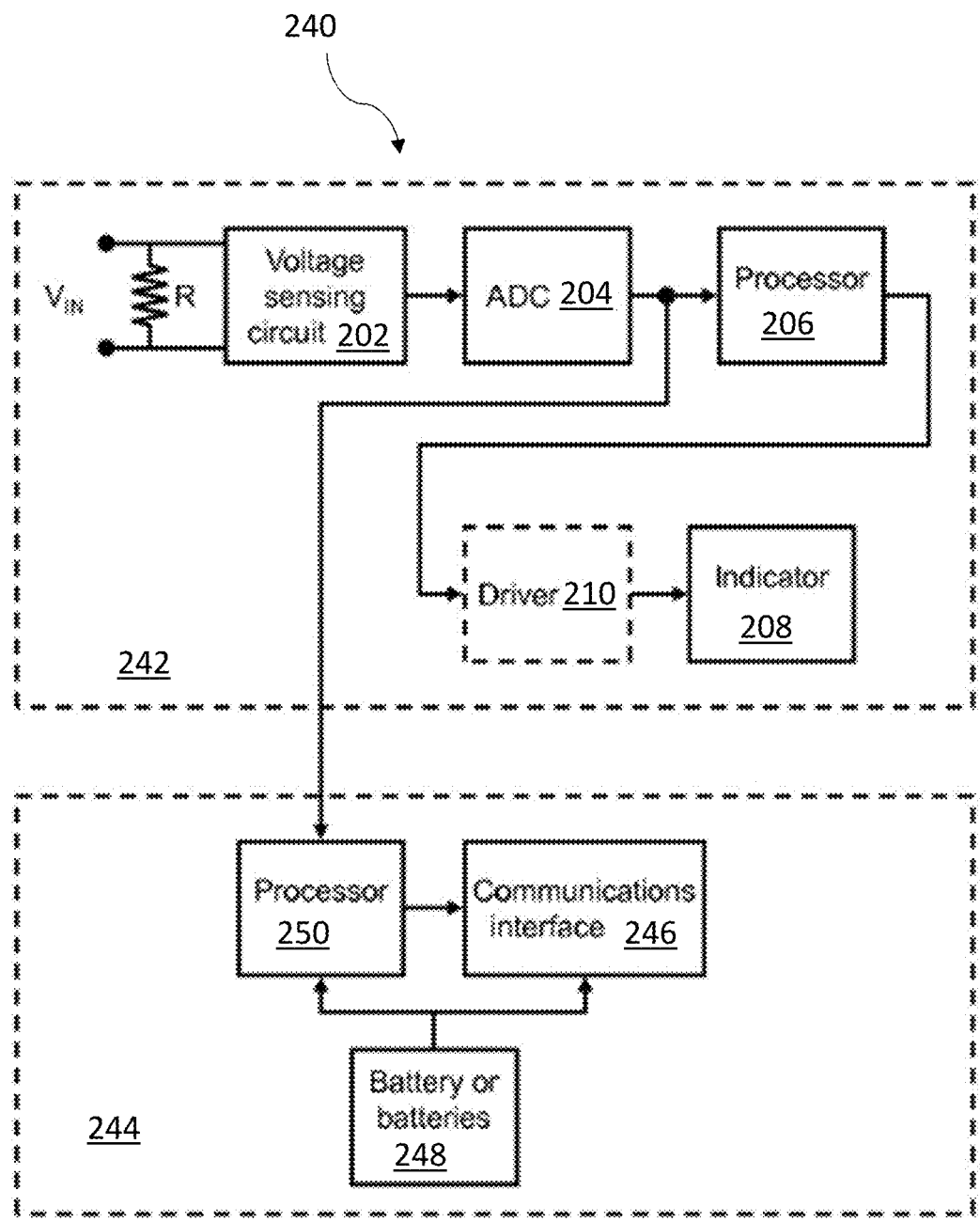
FIG. 12B illustrates a block diagram of an example of control electronics of the battery that is capable of communicating with the SOC mobile application.

FIG. 12B illustrates a block diagram of an example of SOC system 240 of the battery that is capable of communicating with the SOC mobile application 234. In this example, the SOC system 240 includes an SOC portion 242 and a communications portion 244 The SOC portion 242 is substantially the same as the control electronics 200 shown in FIG. 11. The communications portion 244 handles the communication of the SOC information to the SOC mobile application 234 at, for example, the mobile phone 226 and/or the tablet 228.

The communications portion 244 includes a processor 250 that is communicatively connected to the communications interface 246. The digital output of the ADC 204 of the SOC portion 242, which is the SOC information, feeds an input to the processor 250. The processor 250 is operable to be any controller, microcontroller, or microprocessor that is capable of processing program instructions. The communications battery 248 provides power to the processor 250 and the communications interface 246. The one or more communications batteries 248 are operable to be any standard cylindrical battery, such as quadruple-A, triple-A, or double-A, or a battery from the family of button cell and coin cell batteries. A specific example of a communications battery 248 is the CR2032 coin cell 3-volt battery.

In SOC system 240, the SOC portion 242 and the communications portion 244 operate substantially independent of one another. Namely, the communications portion 244 is powered separately from the SOC portion 242 so that the communications portion 244 is not dependent on the presence of the input voltage $V_{IN}$ at the SOC portion 242 for power. Therefore, in this example, the communications portion 244 is operable to transmit information to the SOC mobile application 234 at any time. However, in order to conserve battery life, in one embodiment the processor 250 is programmed to be in sleep mode when no voltage is detected at the input voltage $V_{IN}$ at the SOC portion 242 and to wake up when an input voltage $V_{IN}$ is detected. Alternatively, the processor 250 is programmed to periodically measure the SOC and send SOC information to the SOC mobile application 234 on the at least one remote device periodically, such as every hour, regardless of the state of input voltage $V_{IN}$.

Figure 12C:
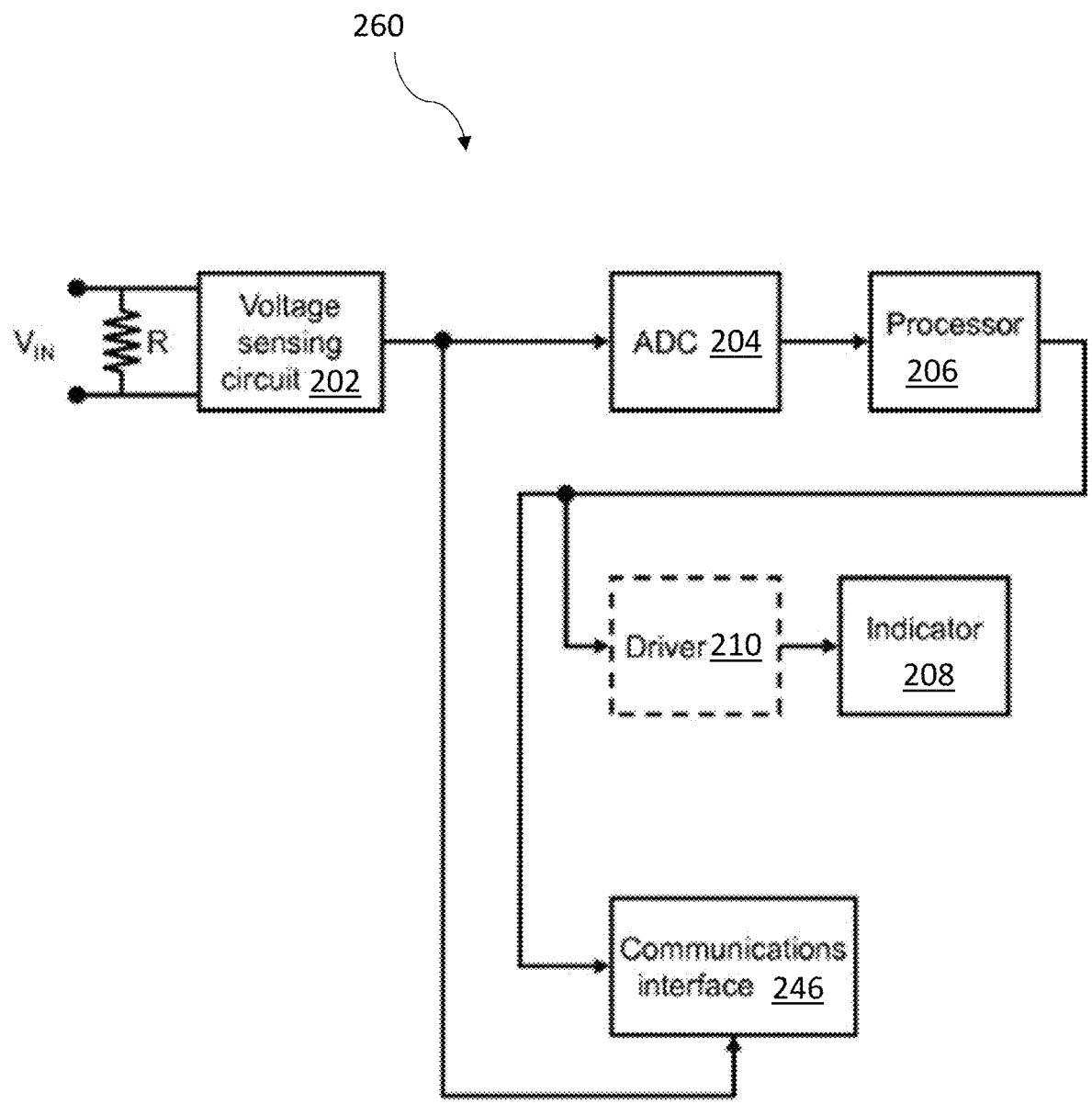
FIG. 12C illustrates a block diagram of another example of control electronics of the battery that is capable of communicating with the SOC mobile application.

FIG. 12C illustrates a block diagram of another example of control electronics 260 of the battery that is capable of communicating with the SOC mobile application 234. In this example, the operation of the communications interface 246 is dependent on the presence of a voltage at input voltage $V_{IN}$. This is because, in control electronics 260, the communications interface 246 is powered from the output of voltage sensing circuit 202. Further, the processor 206 provides the input (i.e., the SOC information) to the communications interface 246. A drawback of the control electronics 260 of FIG. 12C as compared with the SOC system 240 of FIG. 12B, is that it is operable to transmit SOC information to the SOC mobile application 234 only when the battery has a charge.

Figure 13:
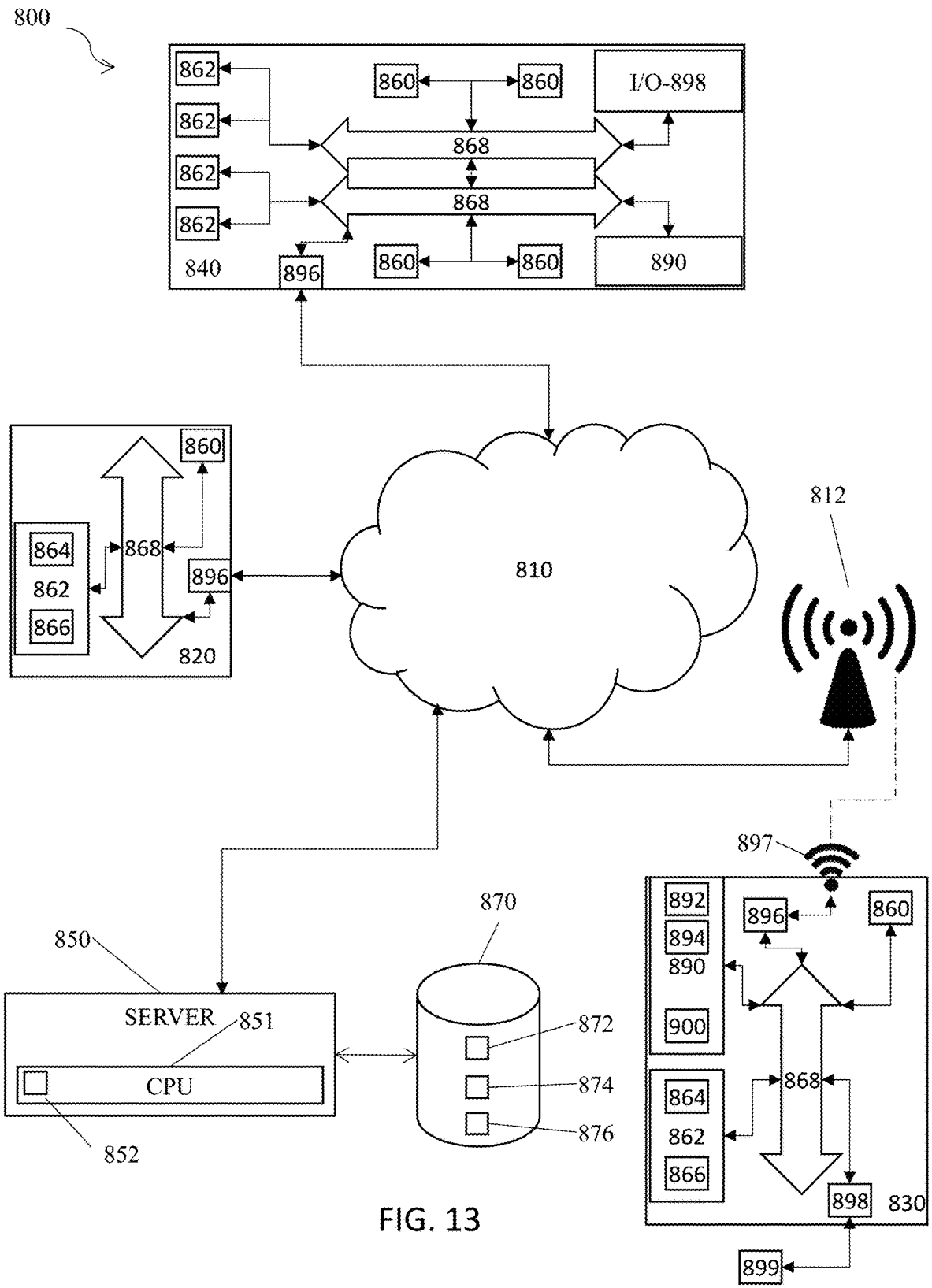
FIG. 13 is a schematic diagram of a system of the present invention.

FIG. 13 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 13, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 13, is operable to include other components that are not explicitly shown in FIG. 13, or is operable to utilize an architecture completely different than that shown in FIG. 13. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A battery housing unit constructed and configured to attach to a military radio comprising:
    a lid;
    a base;
    a plurality of electrochemical battery cells provided within the base; and
    the military radio, wherein the military radio includes four posts and at least one protrusion on a bottom side of the military radio;
    wherein the lid further includes:
        an elevated portion proximal to a first width of the lid, wherein the elevated portion includes at least two channels, wherein the at least two channels are parallel to a first length of the lid and a second length of the lid, wherein each of the at least two channels are configured to receive at least one post of the four posts of the military radio, wherein the at least two channels are longer than the at least one post, wherein the at least two channels include a first channel positioned proximal to the first length of the lid and a second channel positioned proximal to the second length of the lid; and
        a recessed lid portion positioned proximal to a second width of the lid, wherein the recessed lid portion is configured to receive the at least one protrusion of the military radio;
    wherein the base further includes:

a first mounting plaque attached to a first side of the base;
a second mounting plaque attached to a second side of the base;
a first locking latch secured to the first mounting plaque; and
a second locking latch secured to the second mounting plaque;
wherein the first locking latch and the second locking latch are constructed and configured to attach the battery housing unit to a corresponding catch of the military radio.

2. The battery housing unit of claim 1, wherein the at least two channels have a channel length that is equivalent to a length of the elevated portion.

3. The battery housing unit of claim 1, wherein the military radio is an AN/PRC-117G radio, an AN/PRC-160 radio, an AN/PRC-167 radio, a RF-7800H-MP radio, a RF-7800M-MP radio, a RF-7800-RC radio, or a RF-7800-RT intelligence radio.

4. The battery housing unit of claim 1, wherein the at least two channels have a length between about 70 mm to about 100 mm.

5. The battery housing unit of claim 1, wherein the at least two channels have a length greater than about 15 mm.

6. The battery housing unit of claim 1, wherein the elevated portion further includes a military specification radio connector operable to mate to a corresponding military specification radio connector on the military radio.

7. The battery housing unit of claim 1, wherein the base further includes at least one connector.

8. The battery housing unit of claim 1, wherein the battery housing unit includes a coating to protect the plurality of electrochemical battery cells from electromagnetic interference.

9. The battery housing unit of claim 1, wherein the base is comprised of a plastic material and/or a carbon fiber.

10. The battery housing unit of claim 1, wherein the lid is comprised of a plastic material and/or a carbon fiber.

11. The battery housing unit of claim 1, wherein the battery housing unit has a weight of less than about 1.5 kg.

12. The battery housing unit of claim 1, wherein the plurality of electrochemical battery cells is contained in at least one casing.

13. The battery housing unit of claim 1, wherein the lid and/or the base comprises a unitary and integrally formed piece of plastic formed via injection molding.

14. The battery housing unit of claim 1, wherein the recessed portion has a depth of at least 10 mm.

15. The battery housing unit of claim 1, further including at least one stabilizing component in each of the at least two channels configured to prevent the at least one post from moving in a side-to-side motion.

16. A battery housing unit constructed and configured to attach to a military radio comprising:
a lid;
a base;
a plurality of electrochemical battery cells provided within the base; and
the military radio, wherein the military radio includes four posts and at least one protrusion on a bottom side of the military radio;
wherein the lid further includes:
an elevated portion proximal to a first width of the lid, wherein the elevated portion includes at least two channels, wherein the at least two channels are parallel to a first length of the lid and a second length of the lid, wherein each of the at least two channels are configured to receive at least one post of the four posts of the military radio, wherein the at least two channels have a length greater than about 15 mm, wherein the at least two channels include a first channel positioned proximal to the first length of the lid and a second channel positioned proximal to the second length of the lid; and
a recessed lid portion positioned proximal to a second width of the lid, wherein the recessed lid portion is configured to receive the at least one protrusion of the military radio;
wherein the base further includes:
a first mounting plaque attached to a first side of the base;
a second mounting plaque attached to a second side of the base;
a first locking latch secured to the first mounting plaque;
a second locking latch secured to the second mounting plaque; and
at least one connector;
wherein the first locking latch and the second locking latch are constructed and configured to attach the battery housing unit to a corresponding catch of the military radio.

17. The battery housing unit of claim 16, further including at least one dust cap to cover the at least one connector.

18. The battery housing unit of claim 16, wherein the at least one connector includes a keyway, wherein the keyway ensures a correct orientation of a cable attached to the at least one connector, and wherein the keyway angles the cable away from the first locking latch or the second locking latch.

19. A battery housing unit constructed and configured to attach to a military radio comprising:
a lid;
a base;
a plurality of electrochemical battery cells provided within the base; and
the military radio, wherein the military radio includes four posts and at least one protrusion on a bottom side of the military radio;
wherein the lid further includes:
an elevated portion proximal to a first width of the lid, wherein the elevated portion includes at least two channels, wherein the at least two channels are parallel to a first length of the lid and a second length of the lid, wherein each of the at least two channels are configured to receive at least one post of the four posts of the military radio, wherein the at least two channels have a length greater than about 30 mm, wherein the at least two channels include a first channel positioned proximal to the first length of the lid and a second channel positioned proximal to the second length of the lid; and
a recessed lid portion positioned proximal to a second width of the lid, wherein the recessed lid portion is configured to receive the at least one protrusion of the military radio;
wherein the base further includes:
a first mounting plaque attached to a first side of the base;
a second mounting plaque attached to a second side of the base;
a first locking latch secured to the first mounting plaque;

a second locking latch secured to the second mounting plaque; and a coating to protect the plurality of electrochemical battery cells from electromagnetic interference;

wherein the first locking latch and the second locking latch are constructed and configured to attach the battery housing unit to a corresponding catch of the military radio.

20. The battery housing unit of claim 19, wherein the coating comprises copper.

* * * * *